US011817770B2

(12) United States Patent
Liu et al.

(10) Patent No.: US 11,817,770 B2
(45) Date of Patent: Nov. 14, 2023

(54) HYBRID POWER CONVERSION SYSTEM AND CONTROL METHOD

(71) Applicant: Halo Microelectronics International, Campbell, CA (US)

(72) Inventors: Rui Liu, Fremont, CA (US); Thomas Liu, Freemont, CA (US); Songnan Yang, Frisco, TX (US)

(73) Assignee: Halo Microelectronics International, Campbell, CA (US)

( * ) Notice: Subject to any disclaimer, the term of this patent is extended or adjusted under 35 U.S.C. 154(b) by 0 days.

(21) Appl. No.: 17/663,696

(22) Filed: May 17, 2022

(65) Prior Publication Data

US 2022/0376603 A1 Nov. 24, 2022

Related U.S. Application Data

(63) Continuation-in-part of application No. 17/326,503, filed on May 21, 2021, now Pat. No. 11,451,151.

(51) Int. Cl.
*H02M 1/00* (2006.01)
*H02M 3/07* (2006.01)
*H02M 3/158* (2006.01)

(52) U.S. Cl.
CPC ........... *H02M 1/0095* (2021.05); *H02M 3/07* (2013.01); *H02M 3/1584* (2013.01); *H02M 1/0043* (2021.05)

(58) Field of Classification Search
CPC ..... H02M 3/07; H02M 3/1584; H02M 1/0095
See application file for complete search history.

(56) References Cited

U.S. PATENT DOCUMENTS

| 7,397,299 | B2* | 7/2008 | Ki ......................... H02M 3/073 327/536 |
| 8,860,396 | B2* | 10/2014 | Giuliano ................. H02M 3/07 323/288 |
| 11,451,151 | B1* | 9/2022 | Liu ......................... H02M 3/07 |
| 2015/0077073 | A1 | 3/2015 | Yu et al. |
| 2015/0263612 | A1 | 9/2015 | Wu et al. |
| 2016/0344214 | A1 | 11/2016 | Petersen et al. |
| 2017/0244318 | A1* | 8/2017 | Giuliano ................. H02M 3/07 |

(Continued)

FOREIGN PATENT DOCUMENTS

| CN | 107395010 A | 11/2017 |
| CN | 109742949 A | 5/2019 |

(Continued)

*Primary Examiner* — Jue Zhang
(74) *Attorney, Agent, or Firm* — AP3 Law Firm PLLC

(57) ABSTRACT

A converter includes a first phase comprising a plurality of first phase switches connected in series between an input power source and ground, a second phase comprising a plurality of second phase switches connected in series between the input power source and ground, and a first flying capacitor of the first phase and a first flying capacitor of the second phase cross-coupled between the first phase and the second phase, wherein switches of the first phase and switches of the second phase are configured such that a ratio of an input voltage of the hybrid dual-phase step-down power converter to an output voltage of the hybrid dual-phase step-down power converter is equal to N/D, and wherein N is an integer, and D is a duty cycle of the hybrid dual-phase step-down power converter.

21 Claims, 20 Drawing Sheets

(56) References Cited

U.S. PATENT DOCUMENTS

| | | | |
|---|---|---|---|
| 2017/0324326 A1 | 11/2017 | Liu et al. | |
| 2019/0372457 A1* | 12/2019 | Zhang | H02M 1/42 |
| 2020/0169170 A1 | 5/2020 | Zhang | |
| 2020/0212704 A1* | 7/2020 | Eftimie | H02M 3/07 |
| 2021/0075323 A1 | 3/2021 | Jin et al. | |
| 2022/0190714 A1* | 6/2022 | Ye | H02M 3/07 |
| 2023/0013485 A1* | 1/2023 | Kawano | H02M 3/07 |

FOREIGN PATENT DOCUMENTS

| | | |
|---|---|---|
| CN | 208820683 U | 5/2019 |
| CN | 110098740 A | 8/2019 |
| CN | 110247546 A | 9/2019 |
| CN | 209948954 U | 1/2020 |
| CN | 209948956 U | 1/2020 |
| CN | 112737144 A | 4/2021 |
| CN | 113328628 A | 8/2021 |
| CN | 113572242 A | 10/2021 |
| CN | 114006547 A | 2/2022 |
| WO | 2007148354 A1 | 12/2007 |

\* cited by examiner

1002 — Providing a hybrid dual-phase step-up power conversion system comprising a first leg and a second leg comprising a plurality of switches, a first capacitor and a second capacitor cross-coupled between the first leg and the second leg 1004 — In a first operating mode of the hybrid dual-phase step-up power conversion system, configuring the plurality of switches of the first leg and the second leg such that the second capacitor and the first capacitor are connected in series between an output of the hybrid dual-phase step-up power conversion system and ground 1006 — In a second operating mode of the hybrid dual-phase step-up power conversion system, configuring the plurality of switches of the first leg and the second leg such that the first capacitor and the second capacitor are connected in series between the output of the hybrid dual-phase step-up power conversion system and ground

Figure 10

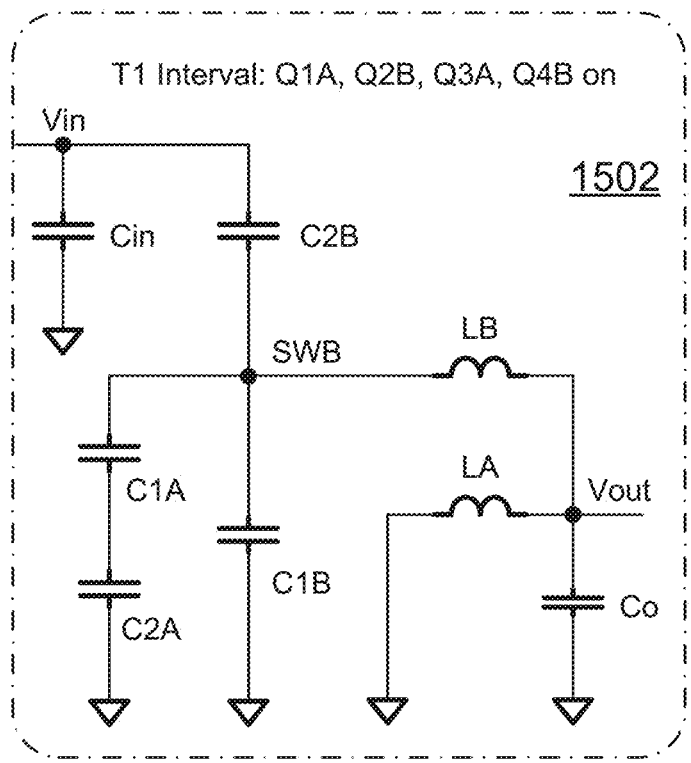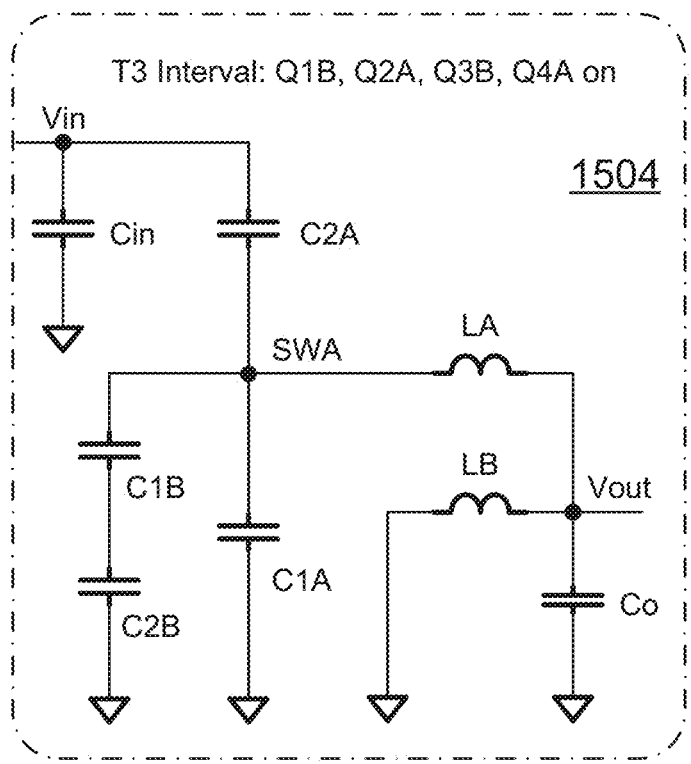
Figure 15

HYBRID POWER CONVERSION SYSTEM AND CONTROL METHOD

PRIORITY CLAIM AND CROSS-REFERENCE

This application is a continuation-in-part of U.S. patent application Ser. No. 17/326,503, filed May 21, 2021, and entitled "Hybrid Power Conversion System and Control Method," which application is hereby incorporated herein by reference.

TECHNICAL FIELD

The present invention relates to a hybrid power conversion system, and, in particular embodiments, to a hybrid dual-phase step-up power conversion system.

BACKGROUND

As technologies further advance, a variety of portable devices, such as mobile phones, tablet PCs, digital cameras, MP3 players and/or the like, have become popular. Batteries provide power for various high voltage applications such as display backlights, audio amplifiers, piezoelectric haptic actuators and the like. For example, each portable device may comprise a Liquid Crystal Display (LCD). The LCD does not emit light by itself. The LCD needs a backlight to provide illumination so as to produce a visible image. The backlight may be formed by a plurality of light-emitting diodes (LEDs). Each LED typically requires 3.3 V to emit light. Depending on the number of the LEDs, the backlight may need a supply voltage up to 20 V. A boost converter may be coupled between a power source (e.g., a battery) and a high voltage load (e.g., a backlight comprising a plurality of LEDs). The boost converter is configured to convert a source voltage (e.g., the output voltage of a battery cell) to a level (e.g., 20 V) suitable for driving the plurality of LEDs.

A conventional boost converter comprises a switching element, a blocking device, an energy storage element and an output filter. The switching element may be implemented as a metal-oxide-semiconductor field-effect transistor (MOSFET). The blocking device may be implemented as a diode. The energy storage element may be implemented as an inductor. The output filter may be implemented as a capacitor. The diode and the MOSFET are connected in series across the capacitor. The inductor is coupled between an input power source and the common node of the diode and the MOSFET transistor. The conventional boost converter is used to provide an output voltage higher than an input voltage from the input power source by modulating the width of a pulse applied to the MOSFET.

In the portable device, the power source may be implemented as a single-cell battery. In order to achieve an output voltage approximately equal to 20 V, the step-up ratio of the conventional boost converter should be 1:4 or higher. Such a high step-up ratio makes it more difficult to achieve the desired efficiency using the conventional boost converter.

A cascaded power conversion system may be employed to achieve better efficiency. The cascaded power conversion system comprises a boost converter and a charge pump converter connected in cascade. The boost converter can adjust its output voltage by varying the duty cycle of the boost converter. The charge pump converter is able to achieve a step-up ratio of 1:2.

FIG. 1 illustrates a single-phase step-up power conversion system. The single-phase step-up power conversion system 100 comprises an input capacitor 101, an input inductor 102, power switches 103, 104, 105, 106, a first capacitor 107, a second capacitor 108, an output capacitor 109 and a single-phase step-up controller 120. The power switches 103-106 are connected in series between an output terminal Vo and ground. The input capacitor 101 is connected between an input terminal VIN and ground. The input inductor 102 is connected between VIN and a common node of switches 103 and 104. The first capacitor 107 is connected between a common node of switches 105 and 106, and the common node of switches 103 and 104. The second capacitor 108 is connected between a common node of switches 104 and 105, and ground. The single-phase step-up controller 120 is configured to generate gate drive signals applied to the gates of switches 103-106, respectively.

In FIG. 1, the input capacitor 101, the input inductor 102, power switches 103, 104 and the second capacitor 108 form a boost converter. The capacitors 107-109 and power switches 103-106 form a 1:2 step-up charge pump converter. Since the output voltage across the output capacitor 109 is equal to twice of the voltage across the second capacitor 108, which is also the output voltage of the boost converter, the output voltage Vo of the single-phase step-up power conversion system 100 is at least two times higher than the input voltage VIN.

FIG. 2 illustrates gate drive signals associated with the single-phase step-up power conversion system shown in FIG. 1. As shown in FIG. 2, power switches 103 and 105 are turned on (e.g., from t1 to t2) and off (e.g., from t2 to t3) at the same time. Likewise, power switches 104 and 106 are on and off at the same time. In addition, power switches 103 and 104 operate in a complimentary manner. Likewise, power switches 105 and 106 operate in a complimentary manner. By varying the duty cycle of power switch 103, the output voltage can be more than twice of the input voltage. For example, the duty cycle is 50%, the output voltage is four times of the input voltage. It should be noted that in a conventional boost converter, a duty cycle of 50% results in an output voltage equal to twice of the input voltage. Furthermore, with the same output voltage, a higher duty cycle of power switch 103 results in a lower root mean square (RMS) current and power dissipation, thereby achieving higher efficiency. One disadvantage of the single-phase step-up power conversion system shown in FIG. 1 is that ripple currents of capacitors 101, 108, and 109 are high, resulting additional power losses in these capacitors. To reduce the power dissipation of these capacitors, a dual-phase step-up power conversion system is used.

FIG. 3 illustrates a dual-phase step-up power conversion system. The dual-phase step-up power conversion system 200 comprises an input capacitor 201, a first input inductor 211, a second input inductor 221, power switches 212, 213, 214, 215, power switches 222, 223, 224, 225, a first capacitor 216, a second capacitor 217, a third capacitor 202, an output capacitor 203 and a dual-phase step-up controller 230.

The power switches 212-215 are connected in series between an output terminal Vo and ground. The power switches 222-225 are connected in series between an output terminal Vo and ground. The input capacitor 201 is connected between an input terminal VIN and ground. The first input inductor 211 is connected between VIN and a common node of switches 213 and 212. The first capacitor 216 is connected between a common node of switches 215 and 214, and the common node of switches 213 and 212. The second input inductor 221 is connected between VIN and a common node of switches 223 and 222. The second capacitor 217 is connected between a common node of switches 225 and 224, and the common node of switches 223 and 222. The third capacitor 202 is connected between a common node of switches 214 and 213, and ground. The common node of switches 224 and 223 is connected to the common node of switches 214 and 213. The dual-phase step-up controller 230 is configured to generate gate drive signals applied to the gates of switches 212-215 and switches 222-225, respectively.

In FIG. 3, the input capacitor 201, the first input inductor 211, power switches 213, 212 and the third capacitor 202 form a first boost converter. The capacitors 202, 216, 203 and power switches 212-215 form a first 1:2 step-up charge pump. The first boost converter and the first 1:2 step-up charge pump form a first phase of the dual-phase step-up power conversion system 200. The input capacitor 201, the second input inductor 221, power switches 223, 222 and the third capacitor 202 form a second boost converter. The capacitors 202, 217, 203 and power switches 222-225 form a second 1:2 step-up charge pump. The second boost converter and the second 1:2 step-up charge pump form a second phase of the dual-phase step-up power conversion system 200. In FIG. 3, capacitors 201, 202, and 203 are shared between the two boost converters and the to 1:2 step-up charger pumps.

FIG. 4 illustrates gate drive signals associated with the dual-phase step-up power conversion system shown in FIG. 3. The operating principle of the power switches in FIG. 4 is similar to that shown in FIG. 2 except that the two phases shown in FIG. 4 are configured to be out of phase from each other. For example, the switch 212 of the first phase is turned on from a first time instant t1 and a second time instant t2. By employing the out of phase control, the corresponding switch of the second phase (e.g., switch 222) is turned on from a third time instant t3 and a fourth time instant t4. Likewise, the switch 212 is turned off from the second time instant t2 and a fifth time instant t5. Switch 222 is turned off from the fourth time instant t4 and a sixth time instant t6. The out of phase control results in cancellation of ripple currents in capacitors 201, 202, and 203, thereby reducing the power dissipation in these capacitors.

Although better efficiency can be achieved with the dual-phase step-up power conversion system shown in FIG. 3, there are eight power switches and five capacitors in the dual-phase step-up power conversion system. The eight power switches need a large silicon area and many external components.

As power consumption has become more important, there may be a need for simplifying the dual-phase step-up power conversion system shown in FIG. 3. More particularly, the dual-phase step-up power conversion system having eight power switches and five capacitors is not cost-effective. It is desirable to have a simplified system to perform the functions of the dual-phase step-up power conversion system described above with respect to FIG. 3-4.

SUMMARY

These and other problems are generally solved or circumvented, and technical advantages are generally achieved, by preferred embodiments of the present disclosure which provide a hybrid dual-phase step-up power conversion system.

In accordance with an embodiment, a hybrid dual-phase step-up power conversion system comprises a first leg comprising a first switch, a second switch and a third switch connected in series between an output terminal of the hybrid dual-phase step-up power conversion system and ground, a second leg comprising a fourth switch, a fifth switch and a sixth switch connected in series between the output terminal of the hybrid dual-phase step-up power conversion system and ground, and a first capacitor and a second capacitor cross-coupled between the first leg and the second leg, wherein switches of the first leg and switches of the second leg are configured such that a sum of a voltage across the first capacitor and a voltage across the second capacitor is fed into the output terminal of the hybrid dual-phase step-up power conversion system.

In accordance with another embodiment, a method comprises providing a hybrid dual-phase step-up power conversion system comprising a first leg and a second leg comprising a plurality of switches, a first capacitor and a second capacitor cross-coupled between the first leg and the second leg, in a first operating mode of the hybrid dual-phase step-up power conversion system, configuring the plurality of switches of the first leg and the second leg such that the second capacitor and the first capacitor are connected in series between an output of the hybrid dual-phase step-up power conversion system and ground, wherein the first capacitor is connected to ground, and in a second operating mode of the hybrid dual-phase step-up power conversion system, configuring the plurality of switches of the first leg and the second leg such that the first capacitor and the second capacitor are connected in series between the output of the hybrid dual-phase step-up power conversion system and ground, wherein the second capacitor is connected to ground.

In accordance with yet another embodiment, a system comprises a first leg comprising a first switch, a second switch and a third switch connected in series between an output terminal of the system and ground, a second leg comprising a fourth switch, a fifth switch and a sixth switch connected in series between the output terminal of the system and ground, a first inductor connected between an input terminal of the system and a common node of the second switch and the third switch, a second inductor connected between the input terminal of the system and a common node of the fifth switch and the sixth switch, a first capacitor connected between a common node of the fourth switch and the fifth switch, and a common node of the second switch and the third switch, and a second capacitor connected between a common node of the first switch and the second switch, and a common node of the fifth switch and the sixth switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 10 illustrates a flow chart of a control method for the dual-phase step-up power conversion system shown in FIG. 5 in accordance with various embodiments of the present disclosure;

FIG. 15 illustrates two equivalent circuit diagrams for the hybrid dual-phase step-down power converter shown in FIG. 14;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hybrid dual-phase step-up power conversion system. The invention may also be applied, however, to a variety of power systems. Hereinafter, various embodiments will be explained in detail with reference to the accompanying drawings.

Figure 1:
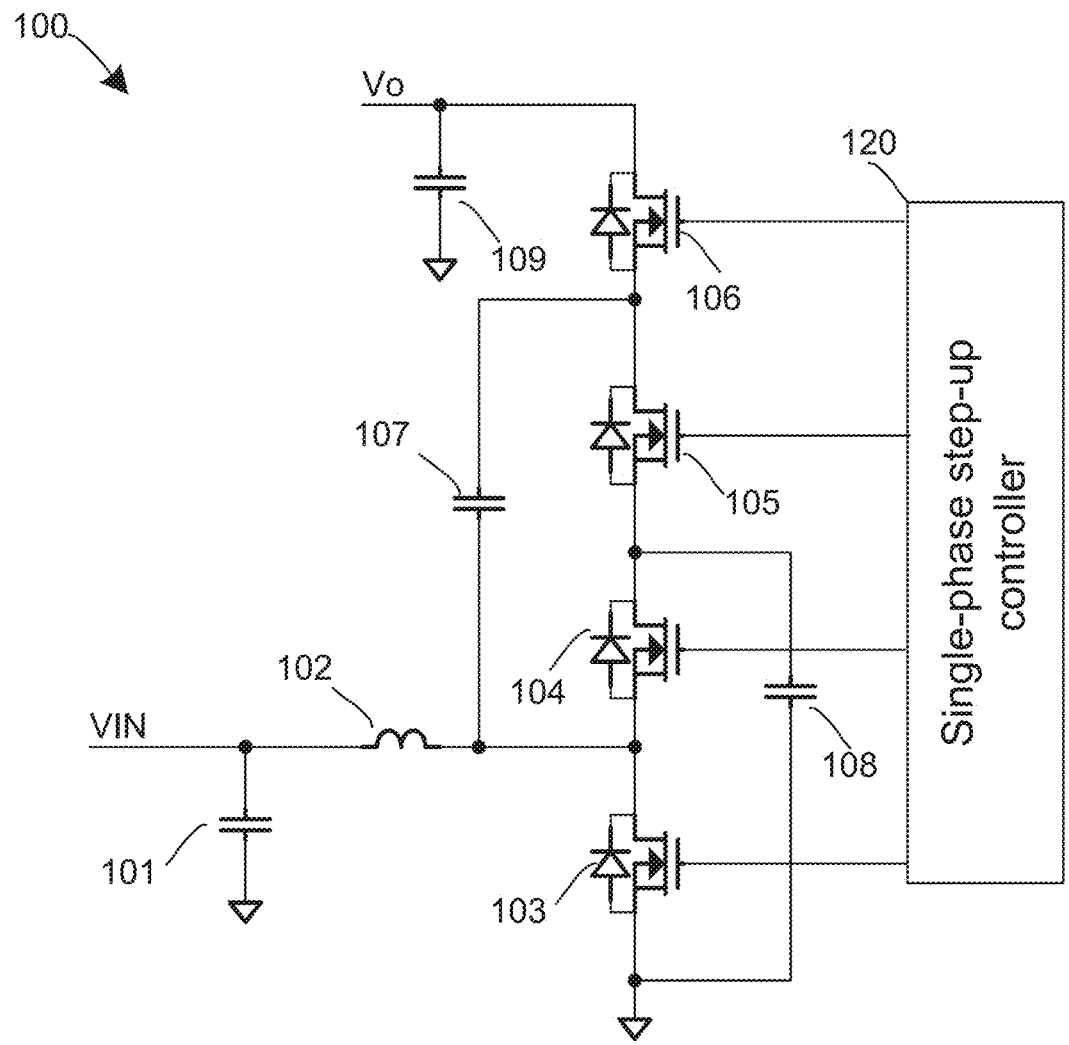
FIG. 1 illustrates a single-phase step-up power conversion system.
Figure 2:
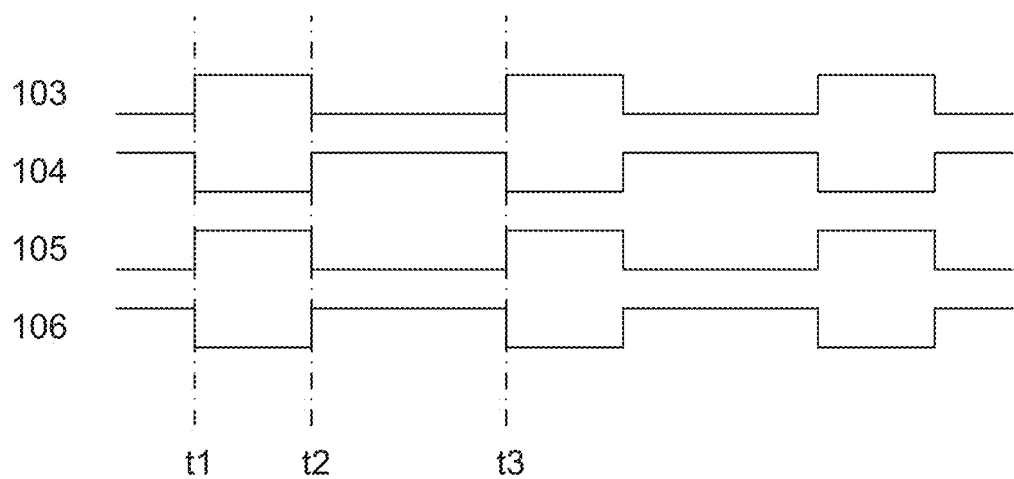
FIG. 2 illustrates gate drive signals associated with the single-phase step-up power conversion system shown in FIG. 1.
Figure 3:
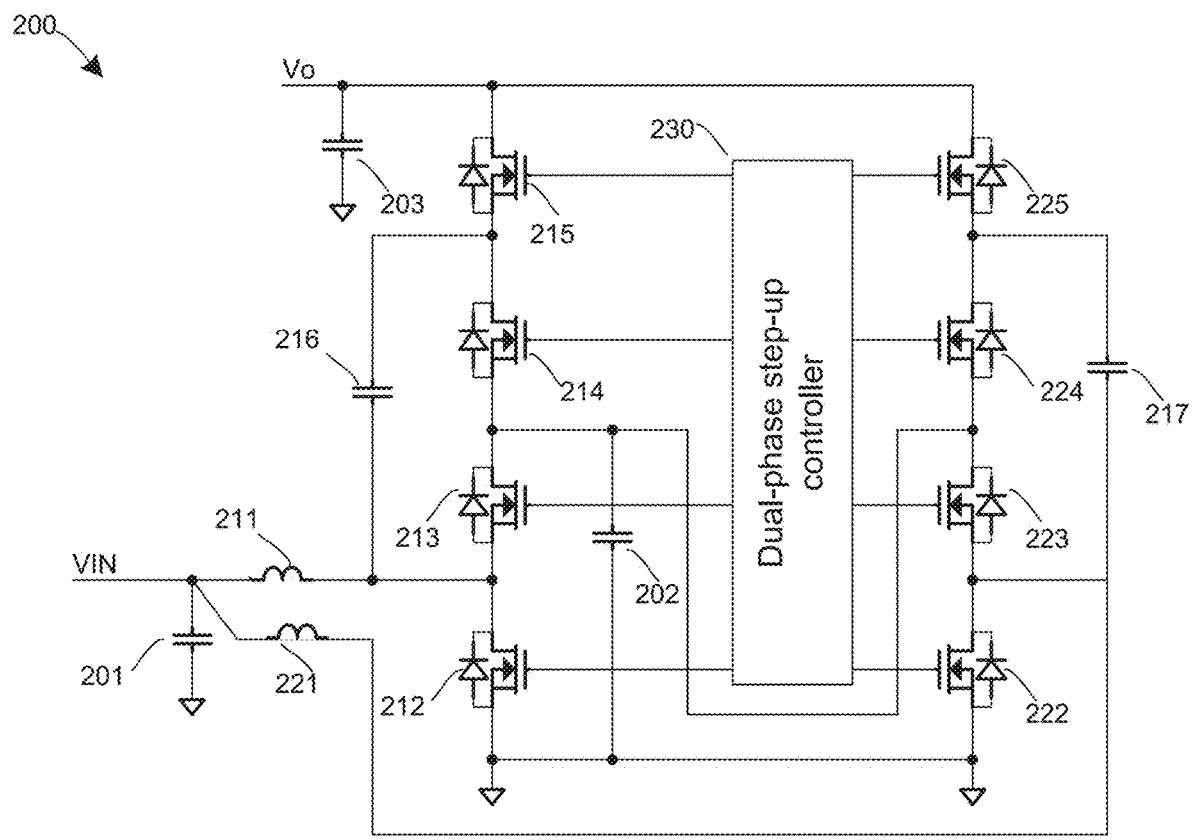
FIG. 3 illustrates a dual-phase step-up power conversion system.
Figure 4:
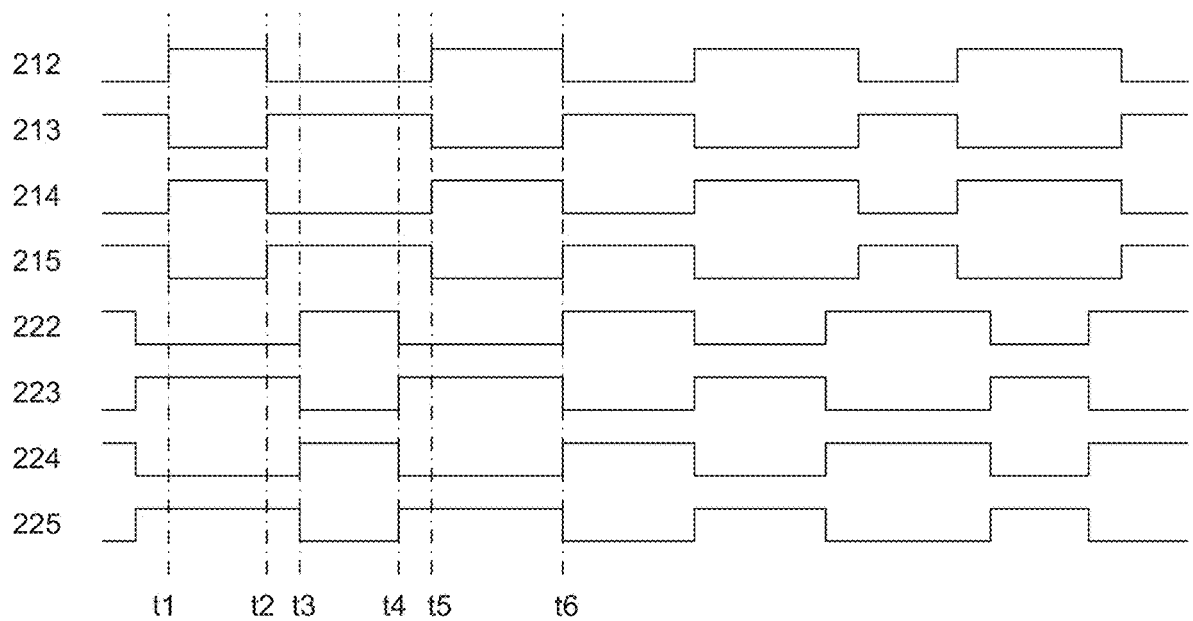
FIG. 4 illustrates gate drive signals associated with the dual-phase step-up power conversion system shown in FIG. 3.
Figure 5:
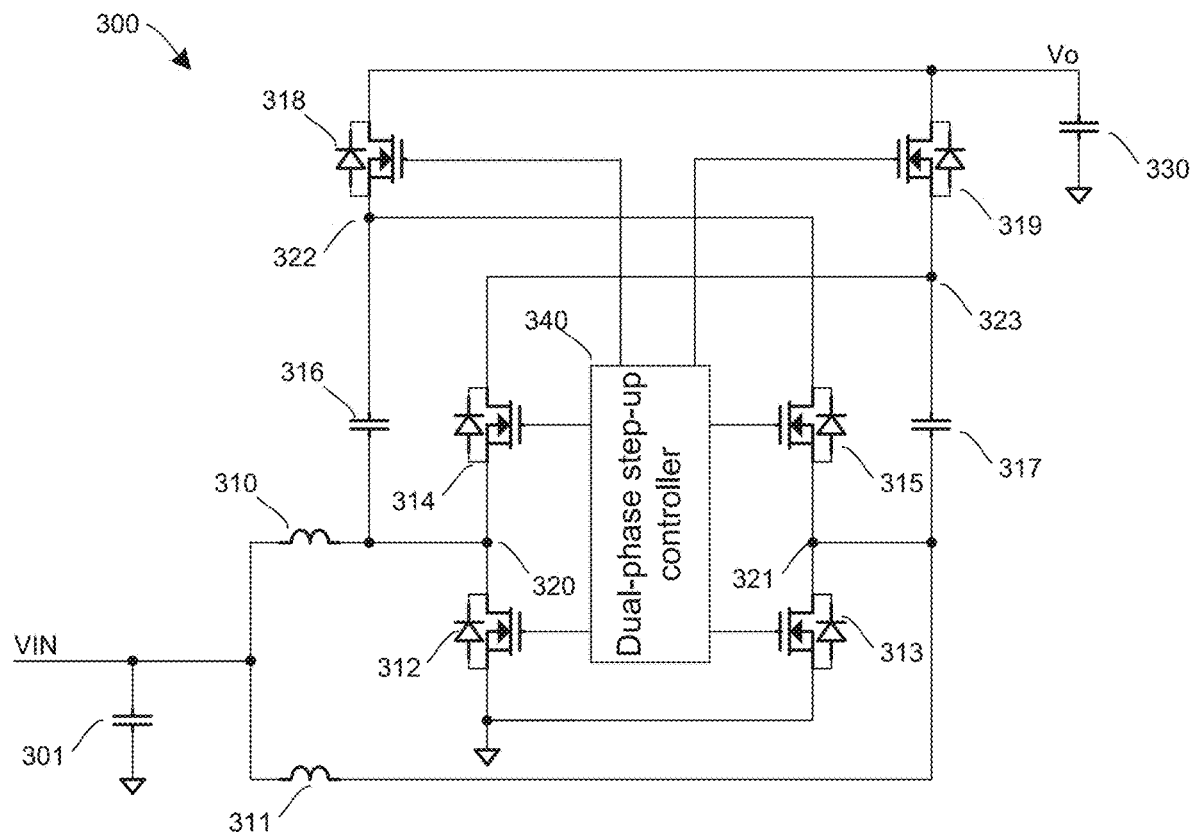
FIG. 5 illustrates a schematic diagram of a hybrid dual-phase step-up power conversion system in accordance with various embodiments of the present disclosure.

FIG. 5 illustrates a schematic diagram of a hybrid dual-phase step-up power conversion system in accordance with various embodiments of the present disclosure. The hybrid dual-phase step-up power conversion system 300 comprises an input capacitor 301, a first inductor 310, a second inductor 311, a first switch 319, a second switch 314, a third switch 312, a fourth switch 318, a fifth switch 315, a sixth switch 313, a first capacitor 316, a second capacitor 317 and an output capacitor 330. The hybrid dual-phase step-up power conversion system 300 further comprises a dual-phase step-up controller 340. The dual-phase step-up controller 340 is employed to generate suitable gate drive signals for controlling the switches 312, 313, 314, 315, 318 and 319.

The hybrid dual-phase step-up power conversion system 300 comprises two legs. A first leg comprises the first switch 319, the second switch 314 and the third switch 312 connected in series between an output terminal Vo and ground. A second leg comprises the fourth switch 318, the fifth switch 315 and the sixth switch 313 connected in series between the output terminal Vo and ground. As shown in FIG. 5, node 323 is a common node of the first switch 319 and the second switch 314. Node 320 is a common node of the second switch 314 and the third switch 312. Node 322 is a common node of the fourth switch 318 and the fifth switch 315. Node 321 is a common node of the fifth switch 315 and the sixth switch 313.

The first inductor 310 is connected between an input terminal VIN and node 320. The second inductor connected between VIN and node 321. The first capacitor 316 and the second capacitor 317 are cross-coupled between the first leg and the second leg. More particularly, the first capacitor 316 is connected between nodes 322 and 320. The second capacitor 317 is connected between nodes 323 and 321.

In some embodiments, the first inductor 310, the second switch 314, the third switch 312, the second inductor 311, the fifth switch 315, the sixth switch 313, the first capacitor 316 and the second capacitor 317 form a boost converter stage of the hybrid dual-phase step-up power conversion system 300. As shown in FIG. 5, the first inductor 310, the second switch 314, the third switch 312 and the second capacitor 317 form a first boost converter. The second inductor 311, the fifth switch 315, the sixth switch 313 and the first capacitor 316 form a second boost converter. On the other hand, the first switch 319, the second switch 314, the third switch 312, the fourth switch 318, the fifth switch 315, the sixth switch 313, the first capacitor 316 and the second capacitor 317 form a charge pump stage of the hybrid dual-phase step-up power conversion system 300. As shown in FIG. 5, the first switch 319, the second switch 314 and the third switch 312 form a first phase of the hybrid dual-phase step-up power conversion system 300. The fourth switch 318, the fifth switch 315 and the sixth switch 313 form a second phase of the hybrid dual-phase step-up power conversion system 300. The first capacitor 316 functions as a first flying capacitor. The second capacitor 317 functions as a second flying capacitor.

It should be noted many components shown in FIG. 5 are shared by the two stages of the hybrid dual-phase step-up power conversion system 300. These shared components help to reduce the total number of switches and capacitors in the hybrid dual-phase step-up power conversion system 300, thereby reducing the cost and improving the reliability of the hybrid dual-phase step-up power conversion system 300.

In operation, the second switch 314 and the third switch 312 are controlled by a first pair of complementary drive signals. The fifth switch 315 and the sixth switch 313 are controlled by a second pair of complementary drive signals. Drive signals of the third switch 312 and the sixth switch 313 are 180 degrees out of phase from each other. In some embodiments, the third switch 312 and the sixth switch 313 are configured to operate with a 50% duty cycle. Under the 50% duty cycle, an output voltage of the hybrid dual-phase step-up power conversion system 300 is four times greater than an input voltage of the hybrid dual-phase step-up power conversion system. In alternative embodiments, for adjusting the output voltage of the hybrid dual-phase step-up power conversion system, the third switch 312 and the sixth switch 313 may be configured to operate with a duty cycle in a range from 50% to 100%. The output voltage may be adjusted through varying the duty cycle.

In operation, switches of the first leg and switches of the second leg are configured such that a sum of a voltage across the first capacitor 316 and a voltage across the second capacitor 317 is fed into the output terminal of the hybrid dual-phase step-up power conversion system 300. More particularly, when the duty cycle is equal to 50%, the hybrid dual-phase step-up power conversion system 300 is configured to operate in two different operating modes. In a first operating mode, the third switch 312, the fifth switch 315, the first switch 319 are configured to be turned on, and the second switch 314, the sixth switch 313, the fourth switch 318 are configured to be turned off In the first operating mode, the first capacitor 316 functions as an output capacitor of a boost converter stage of the hybrid dual-phase step-up power conversion system. The second capacitor 317 and the first capacitor 316 are connected in series between an output of the hybrid dual-phase step-up power conversion system and ground.

In a second operating mode, the third switch 312, the fifth switch 315, the first switch 319 are configured to be turned off, and the second switch 314, the sixth switch 313, the fourth switch 318 are configured to be turned on. In the second operating mode, the second capacitor 317 functions as an output capacitor of the boost converter stage of the hybrid dual-phase step-up power conversion system. The first capacitor 316 and the second capacitor 317 are connected in series between an output of the hybrid dual-phase step-up power conversion system and ground.

Furthermore, when the duty cycle is in a range from 50% to 100%, the hybrid dual-phase step-up power conversion system 300 is configured to operate in three different operating modes. The first two modes are similar to those described above, and hence are not discussed again to avoid repetition. In a third operating mode of the hybrid dual-phase step-up power conversion system, the third switch 312 and the sixth switch 313 are configured to be turned on, and the first switch 319, the second switch 314, the fourth switch 318 the fifth switch 315 are configured to be turned off In the third operating mode, the first capacitor 316 and the second capacitor 317 are floating. The detailed description of these three operating modes will be described below with respect to FIGS. 6-9.

In accordance with an embodiment, the switches of FIG. 5 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 5 shows the switches (e.g., switch 312) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 5 may be implemented as a plurality of switches connected in parallel. Moreover, a capacitor may be connected in parallel with one switch to achieve zero voltage switching (ZVS)/ zero current switching (ZCS).

Figure 6:
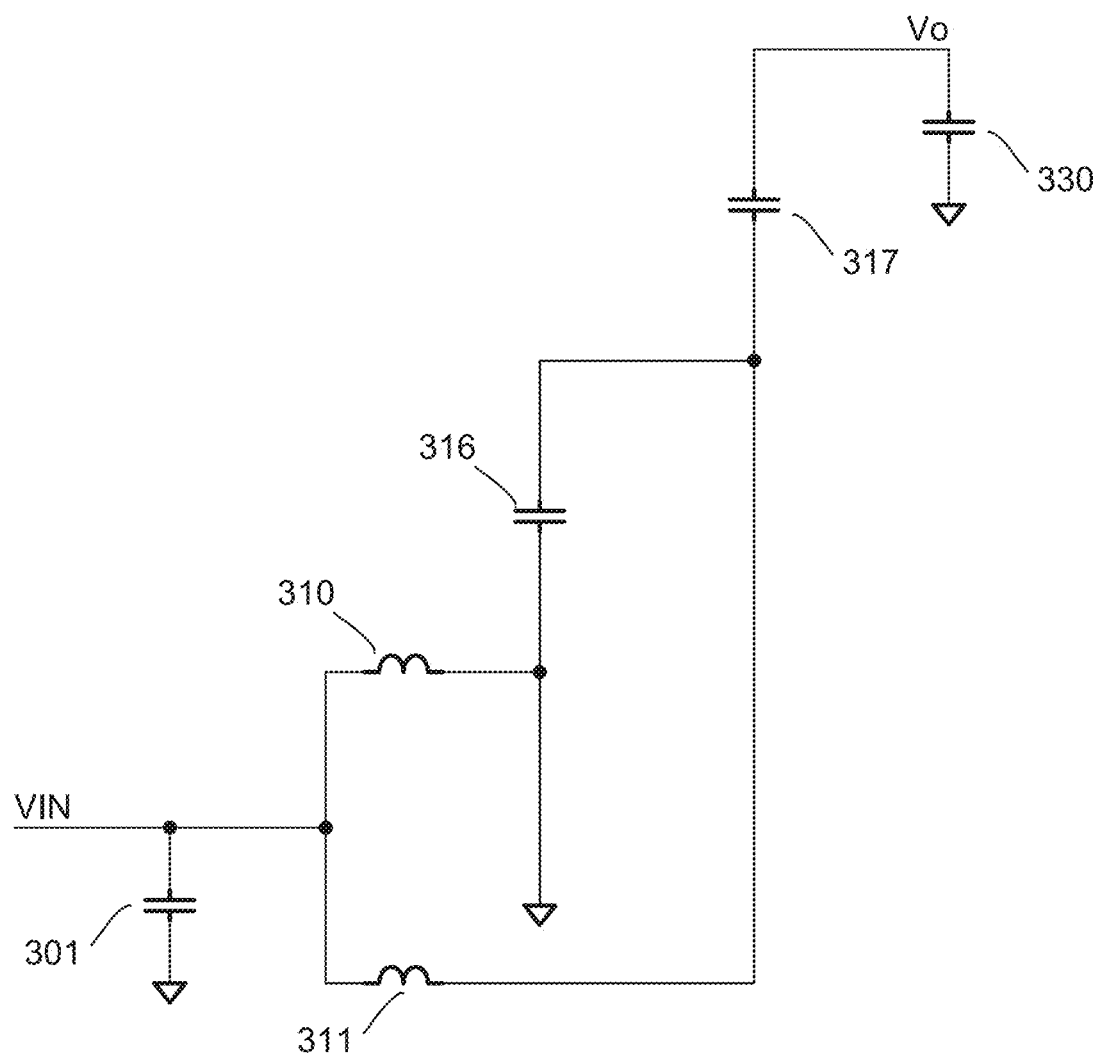
FIG. 6 illustrates an equivalent circuit of a first operating mode of the dual-phase step-up power conversion system shown in FIG. 5 in accordance with various embodiments of the present disclosure.
Figure 7:
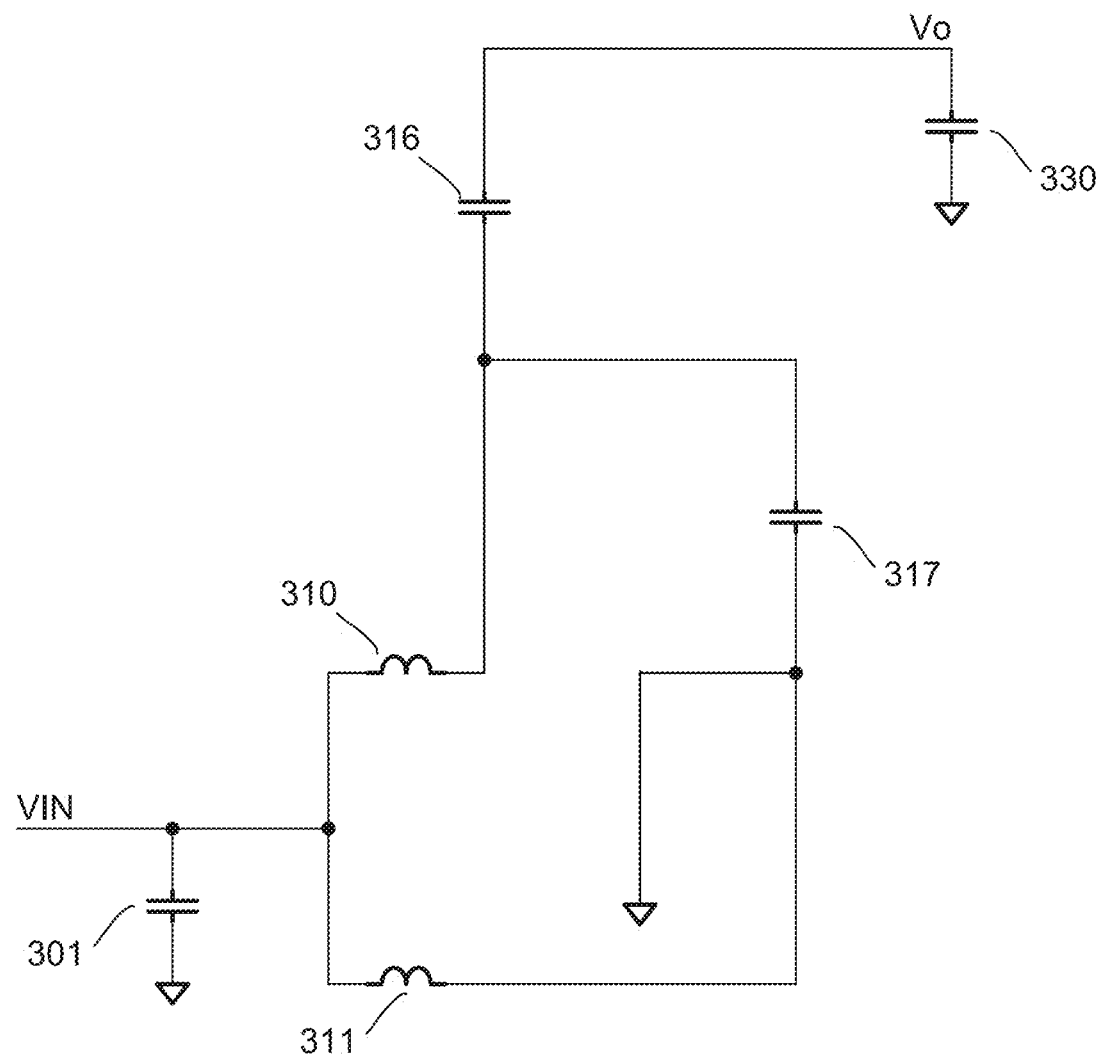
FIG. 7 illustrates an equivalent circuit of a second operating mode of the dual-phase step-up power conversion system shown in FIG. 5 in accordance with various embodiments of the present disclosure.
Figure 8:
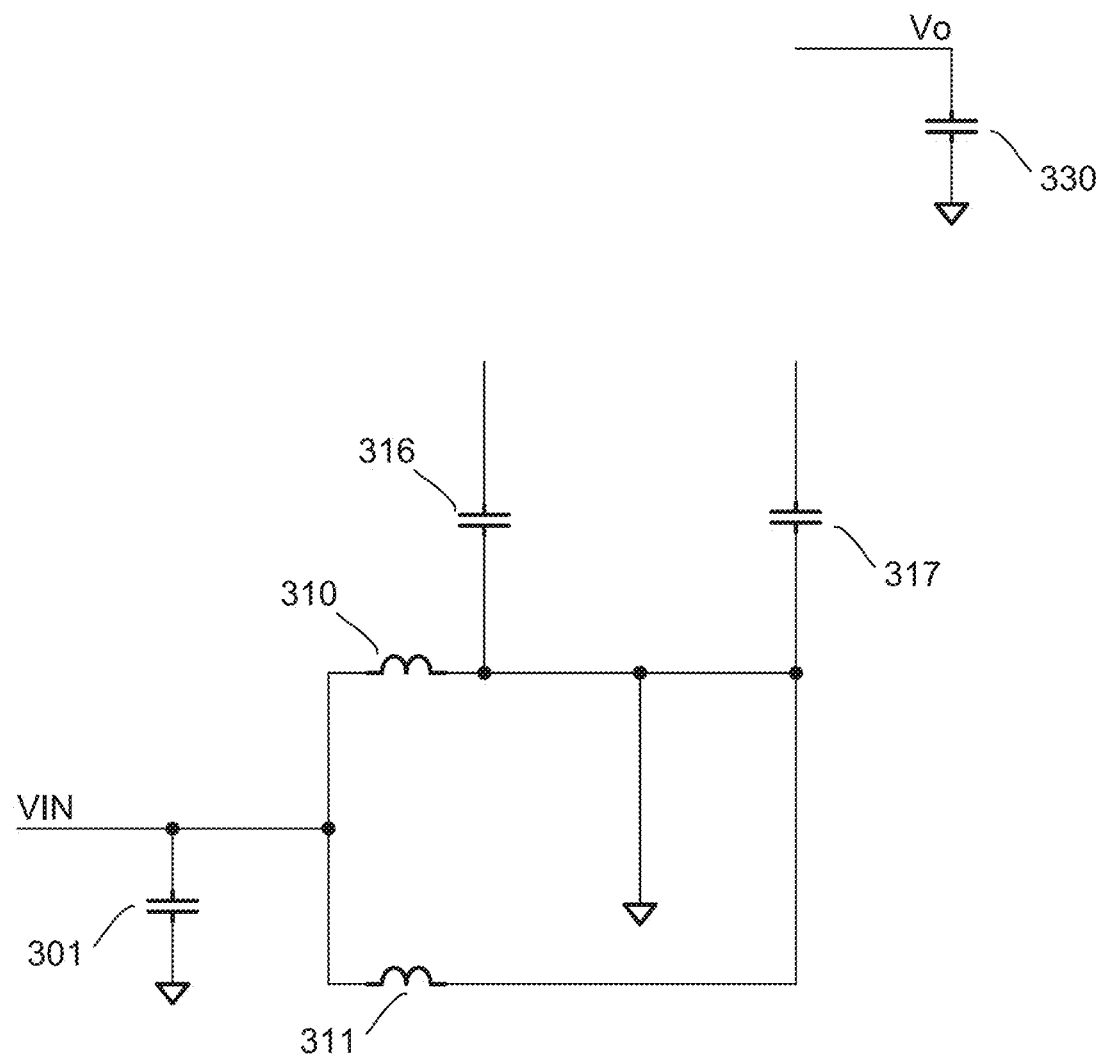
FIG. 8 illustrates an equivalent circuit of a third operating mode of the dual-phase step-up power conversion system shown in FIG. 5 in accordance with various embodiments of the present disclosure.

FIGS. 6-8 illustrate the three operating modes of the dual-phase step-up power conversion system shown in FIG. 5. To aid understanding and clarity, only the components relevant to this discussion are shown in FIGS. 6-8. Furthermore, the respective switches are shown as simple conductors (straight lines) when the switches are in the on state, and the respective switches are shown as open circuits when the switches are in the off state.

FIG. 6 illustrates an equivalent circuit of a first operating mode of the dual-phase step-up power conversion system shown in FIG. 5 in accordance with various embodiments of the present disclosure. In the first operating mode, the third switch 312, the fifth switch 315 and the first switch 319 are turned on, and the second switch 314, the sixth switch 313 and the fourth switch 318 are turned off.

In response to the turn-on of the third switch 312, the node 320 is connected to ground. The input voltage is applied to the first inductor 310. The current flowing through the first inductor 310 increases. In response to the increased current, the energy stored in the first inductor 310 increases accordingly.

In response to the turn-on of the fifth switch 315, the second inductor 311 is connected to the first capacitor 316. The current flowing through the second inductor 311 is fed into the first capacitor 316, and the energy stored in the second inductor 311 is deposited into the first capacitor 316.

Referring back to FIG. 5, in some embodiments, the third switch 312 and the sixth switch 313 operate with a duty cycle of 50%. Under this duty cycle, the average voltage across the first capacitor 316 is twice the voltage of the input voltage (VIN). The first capacitor 316 and the second capacitor 317 function as output capacitors of the second boost converter (formed by components 311, 313 and 315) and the first boost converter (formed by components 310, 312 and 314) respectively. These two boost converters are configured to operate in a symmetrical manner. Because of symmetry, the average voltage across the first capacitor 316 is equal to that of the second capacitor 317.

In response to the turn-on of the fifth switch 315 and the first switch 319, the second capacitor 317 is connected in series with the first capacitor 316 between the output terminal Vo and ground. The voltage across the series combination of the two capacitors is twice that of each individual capacitor or four times that of the input voltage (VIN).

FIG. 7 illustrates an equivalent circuit of a second operating mode of the dual-phase step-up power conversion system shown in FIG. 5 in accordance with various embodiments of the present disclosure. In the second operating mode, the third switch 312, the fifth switch 315 and the first switch 319 are turned off, and the second switch 314, the sixth switch 313 and the fourth switch 318 are turned on.

In response to the turn-on of the sixth switch 313, the node 321 is connected to ground. The input voltage is applied to the second inductor 311. The current flowing through the second inductor 311 increases. In response to the increased current, the energy stored in the second inductor 311 increases accordingly.

In response to the turn-on of the second switch 314, the first inductor 310 is connected to the second capacitor 317. The current flowing through the first inductor 310 is fed into the second capacitor 317, and the energy stored in the first inductor 310 is deposited into the second capacitor 317. In some embodiments, the third switch 312 and the sixth switch 313 operate with a duty cycle of 50%. Under this duty cycle, the average voltage across the second capacitor 317 is twice the voltage of the input VIN.

In response to the turn-on of the second switch 314 and the fourth switch 318, the first capacitor 316 is connected in series with the second capacitor 317 between the output terminal Vo and ground. The voltage across the series combination of the two capacitors is twice that of each individual capacitor or four times that of the input VIN.

FIG. 8 illustrates an equivalent circuit of a third operating mode of the dual-phase step-up power conversion system shown in FIG. 5 in accordance with various embodiments of the present disclosure. In the third operating mode, the third switch 312 and the sixth switch 313 are turned on, and the first switch 319, the second switch 314, the fourth switch 318 and the fifth switch 315 are turned off.

In response to the turn-on of the third switch 312, the node 320 is connected to ground. The input voltage is applied to the first inductor 310. The current flowing through the first inductor 310 increases. In response to the increased current, the energy stored in the first inductor 310 increases accordingly.

In response to the turn-on of the sixth switch 313, the node 321 is connected to ground. The input voltage is applied to the second inductor 311. The current flowing through the second inductor 311 increases. In response to the increased current, the energy stored in the second inductor 311 increases accordingly.

In response to the turn-off of the first switch 319, the second switch 314, the fourth switch 318 and the fifth switch 315, the first capacitor 316 and the second capacitor 317 are floating as shown in FIG. 8.

Figure 9:
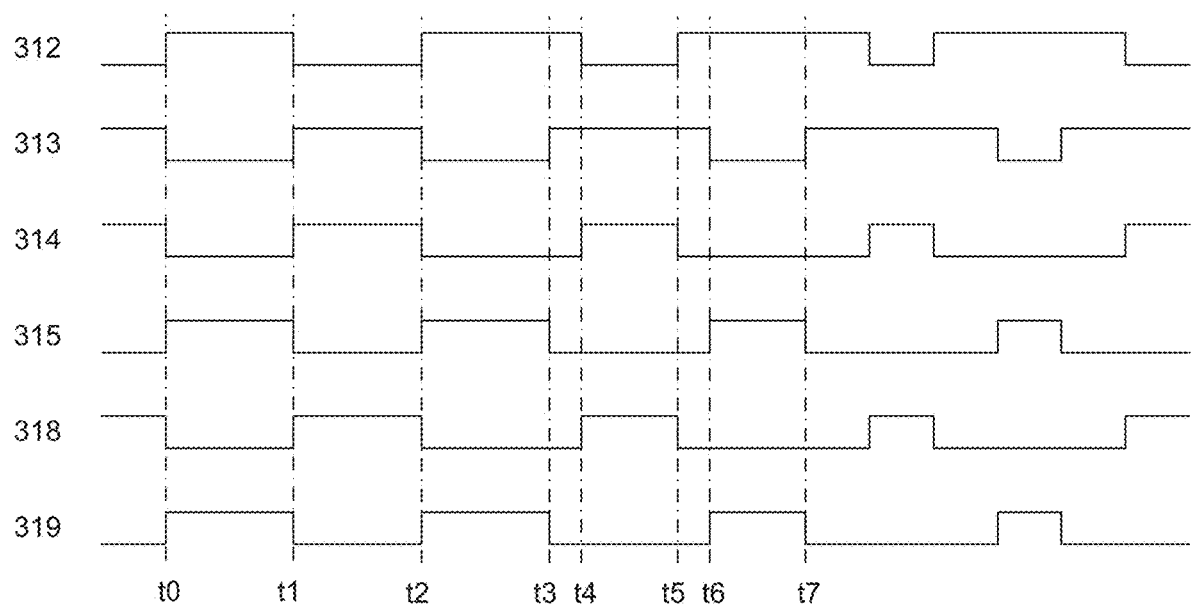
FIG. 9 illustrates gate drive signals associated with the dual-phase step-up power conversion system shown in FIG. 5 in accordance with various embodiments of the present disclosure.

FIG. 9 illustrates gate drive signals associated with the dual-phase step-up power conversion system shown in FIG. 5 in accordance with various embodiments of the present disclosure. Referring back to FIG. 5, the dual-phase step-up controller 340 is configured to generate the gate drive signals for switches 312, 313, 314, 315, 318 and 319. In some embodiments, the duty cycle of the switches 312 and 313 is in a range from 50% to 100%. As shown in FIG. 9, from t0 to t2, the switches 312 and 314 operate in a complementary manner. Switches 313 and 315 operate in a complementary manner. The gate drive signals of switches 312 and 314 are 180 degrees out of phase from each other. The switch 318 is in synchronization with the switch 314. The switch 319 is in synchronization with the switch 315.

From t0 to t2, the switches 312 and 313 operate with a duty cycle of 50%. The step-up ratio of the dual-phase step-up power conversion system is 1:4. The switches 312 and 313 can operate at a duty cycle greater than 50% to increase the step-up ratio up to a level greater than 1:4. In some embodiments, the dual-phase step-up controller 340 senses the output voltage Vo, and adjusts the duty cycle (from 50% to 100%) in a closed loop manner to achieve tight regulation of the dual-phase step-up power conversion system. The detailed operating principle of configuring the switches 312 and 313 to operate at a duty cycle greater than 50% will be discussed below.

From t2 to t3, the switch 312 is turned on and the switch 314 is turned off for a first time period corresponding to a duty cycle greater than 50%. The first time period is defined as DT. From t4 to t5, the switch 312 is turned off and the switch 314 is turned on for a second time period corresponding to one minus the duty cycle. The second time period is defined as T-DT. The phase difference between t2 and t3 is 18 degrees. From t3 to t6, the switch 313 is turned on and the switch 315 is turned off for a time period equal to DT. From t6 to t7, the switch 313 is turned off and the switch 315 is turned on for a time period equal to T-DT. The gate drive signal of the switch 318 is in synchronization with the gate drive signal of the switch 314. Likewise, the gate drive signal of the switch 319 is in synchronization with the gate drive signal of the switch 315.

Referring back to FIG. 6, the first operating mode shown in FIG. 6 corresponds to the switch configuration shown from t2 to t3 or from t0 to t1. Based on this switch configuration, the second capacitor 317 is connected in series with the first capacitor 316 between the output terminal Vo and ground.

Referring back to FIG. 7, the second operating mode shown in FIG. 7 corresponds to the switch configuration shown from t4 to t5 or from t1 to t2. Based on this switch configuration, the first capacitor 316 is connected in series with the second capacitor 317 between the output terminal Vo and ground.

Referring back to FIG. 8, the third operating mode shown in FIG. 8 corresponds to the switch configuration shown from t3 to t4. The time period from t3 to t4 is equal to DT-(T/2). Based on this switch configuration, the first capacitor 316 and the second capacitor 317 are floating. In particular, capacitors 316 and 317 are not connected in series, but are both switched to ground on one terminal and are unconnected on the other terminal. In addition, inductors 310 and 311 are both switched to ground on one terminal.

It should be noted that in the third operating mode (from t3 to t4), the charge pump stage is not active. Switches 318 and 319 are turned off to prevent discharging of the output capacitor 330.

It should further be noted that the switches 312 and 313 may operate with a duty cycle less than 50%. When the duty cycle is less than 50%, the dual-phase step-up controller 340 may create an operating mode in which switches 314 and 315 are simultaneously turned on. In response to the turn-on of switches 314 and 315, the capacitors 316 and 317 are connected in antiparallel. Such an antiparallel connection discharges the capacitors 316 and 317.

FIG. 10 illustrates a flow chart of a control method for the dual-phase step-up power conversion system shown in FIG. 5 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

A hybrid dual-phase step-up power conversion system comprises a boost converter stage and a charge pump stage. The boost converter stage and the charge pump stage share a plurality of switches and capacitors. When the boost converter stage operates with a duty cycle equal to 50%, the dual-phase step-up power conversion system is configured to operate in two different operating modes. The step-up ratio of the dual-phase step-up power conversion system is 1:4. When the boost converter stage operates with a duty cycle greater than 50%, the dual-phase step-up power conversion system is configured to operate in three different operating modes. The step-up ratio is greater than 1:4.

At step 1002, a hybrid dual-phase step-up power conversion system is provided to convert an input voltage to an output voltage higher than the input voltage. The hybrid dual-phase step-up power conversion system comprises a first leg and a second leg. Both legs comprise a plurality of switches. The system further comprises a first capacitor and a second capacitor cross-coupled between the first leg and the second leg. In some embodiments, the hybrid dual-phase step-up power conversion system is implemented as the system shown in FIG. 5.

At step 1004, in a first operating mode of the hybrid dual-phase step-up power conversion system, the plurality of switches of the first leg and the second leg is configured such that the second capacitor and the first capacitor are connected in series between an output of the hybrid dual-phase step-up power conversion system and ground.

At step 1006, in a second operating mode of the hybrid dual-phase step-up power conversion system, the plurality of switches of the first leg and the second leg is configured such that the first capacitor and the second capacitor are connected in series between the output of the hybrid dual-phase step-up power conversion system and ground.

Figure 11:
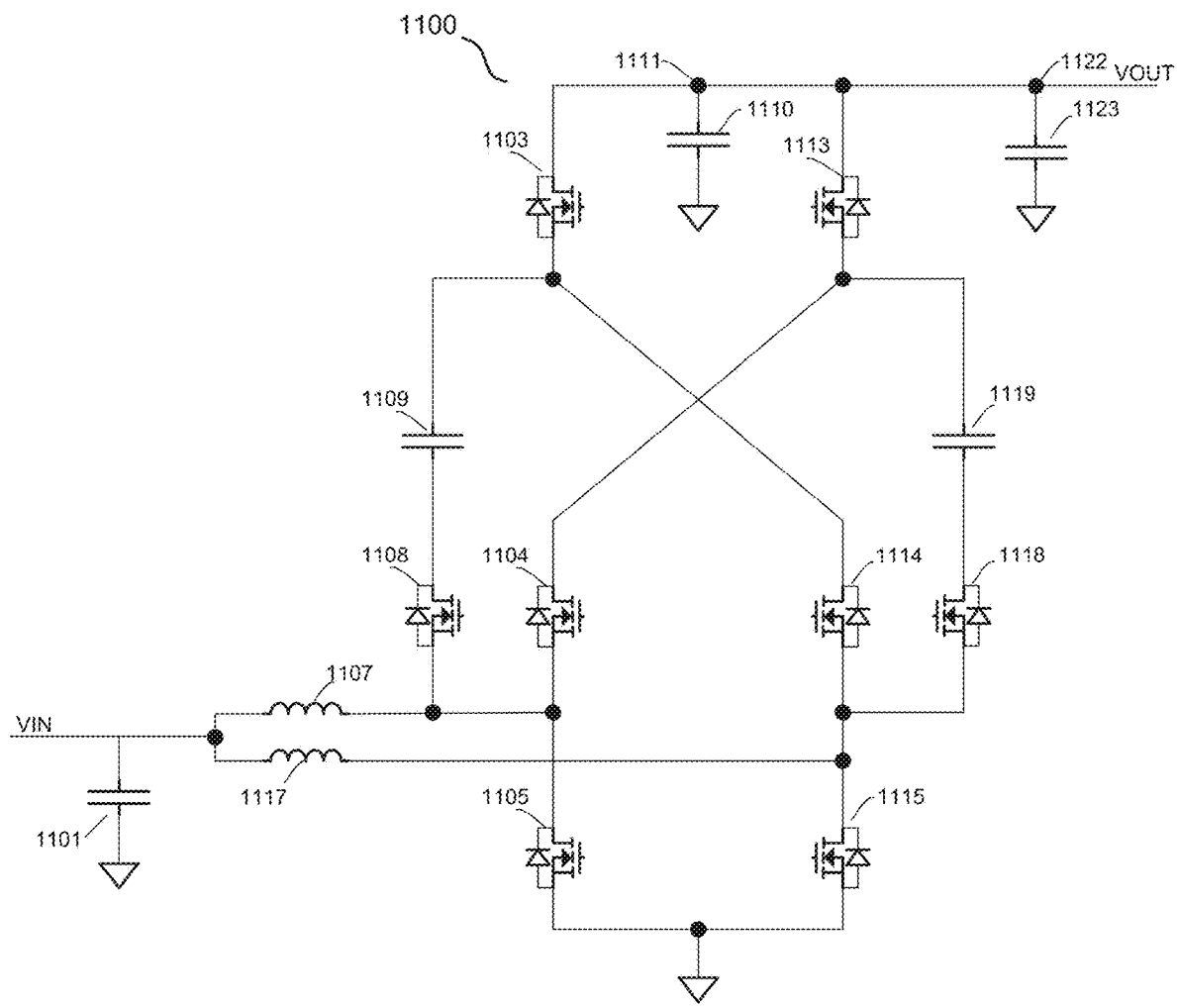
FIG. 11 illustrates a schematic diagram of another hybrid dual-phase step-up power conversion system in accordance with various embodiments of the present disclosure.

FIG. 11 illustrates a schematic diagram of another hybrid dual-phase step-up power conversion system in accordance with various embodiments of the present disclosure. The hybrid dual-phase step-up power conversion system 1100 comprises switches 1103, 1104, 1105, 1108, 1113, 1114, 1115 and 1118, capacitors 1101, 1109, 1119, 1110 and 1123, and inductors 1107 and 1117. The structure and operating principle of the hybrid dual-phase step-up power conversion system 1100 are similar to those of the hybrid dual-phase step-up power conversion system 300 shown in FIG. 5 except that switches 1108 and 1118 are employed to further improve the performance of the hybrid dual-phase step-up power conversion system. In particular, the hybrid dual-phase step-up power conversion system 1100 may be configured as a dual-phase boost conversion system through turning off the switches 1108 and 1118. The dual-phase boost configuration of the system (turning off switches 1108 and 1118) may be alternatively referred to as a bypass mode of the hybrid dual-phase step-up power conversion system 1100. The dual-phase boost conversion system is well known in the art, and hence is not discussed in detail to avoid repetition.

Figure 12:
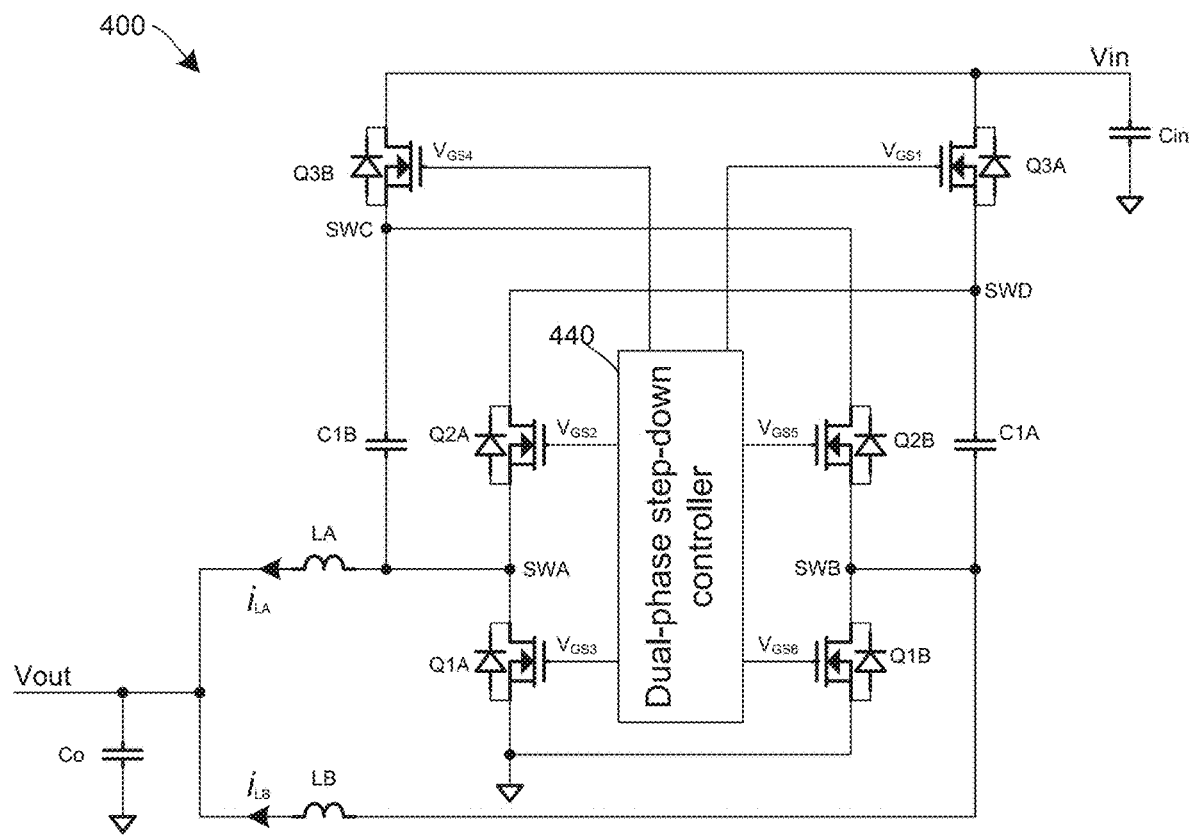
FIG. 12 illustrates a schematic diagram of the hybrid dual-phase step-up power converter of FIG. 5 operating in a step-down power conversion mode.

Referring back to FIG. 5, if the input and the output of the hybrid dual-phase step-up power converter shown in FIG. 5 are swapped, the converter can be used as a step-down power converter operating with the same control scheme described above. Such a system is called a reciprocal system. FIG. 12 illustrates a schematic diagram of the hybrid dual-phase step-up power converter of FIG. 5 operating in a step-down power conversion mode. Since the converter shown in FIG. 12 functions as a step-down converter, the converter shown in FIG. 12 is alternatively reference to as a hybrid dual-phase step-down power converter.

As shown in FIG. 12, the hybrid dual-phase step-down power converter 400 includes two phases. A first phase comprises power switches Q1A, Q2A, Q3A, a flying capacitor C1A and an output inductor LA. The power switches Q1A, Q2A and Q3A are connected in series between ground and the input power source Vin. The common node SWD of the power switches Q2A and Q3A is connected to the flying capacitor C1A. The other terminal of the flying capacitor C1A is connected to the common node SWB of the power switches Q1B and Q2B. The output inductor LB is also connected to the common node SWB.

A second phase comprises power switches Q1B, Q2B, Q3B, a flying capacitor C1B and an output inductor LB. Power switches Q1B, Q2B and Q3B are connected in series between ground and the input power source Vin. The common node SWC of the power switches Q2B and Q3B is connected to the flying capacitor C1B. The other terminal of the flying capacitor C1B is connected to the common node SWA of the power switches Q1A and Q2A. The output inductor LA is also connected to the common node SWA.

Both phases of the hybrid dual-phase step-down power converter 400 share an input filtering capacitor Cin and an output filtering capacitor Co. The input filtering capacitor Cin is connected between the input power source Vin and ground. The output filtering capacitor Co is connected to a common node of the output inductors LA and LB and the ground. The hybrid dual-phase step-down power converter 400 can be viewed as a combination of a dual phase 2:1 switched capacitor converter and a dual-phase buck converter.

As mentioned before, the operation of the hybrid dual-phase step-down power converter 400 is also configured to operate in four different time intervals over one switching cycle. The switching period is defined as Ts. Ts is equal to one over the switching frequency (fs).

Figure 13:
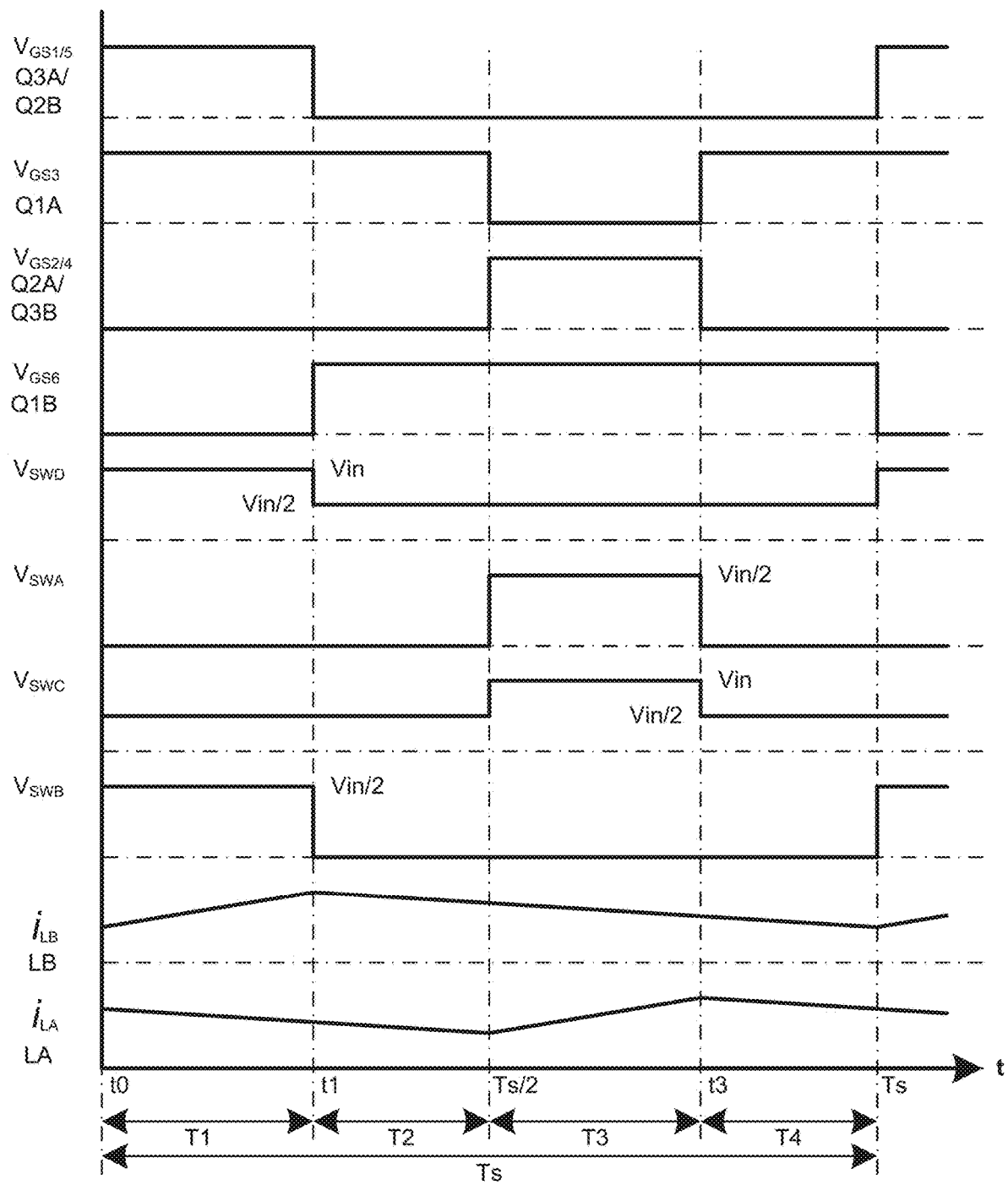
FIG. 13 illustrates various waveforms associated with the hybrid dual-phase step-down converter shown in FIG. 12 in accordance with various embodiments of the present disclosure.

FIG. 13 illustrates various waveforms associated with the hybrid dual-phase step-down converter shown in FIG. 12 in accordance with various embodiments of the present disclosure. The horizontal axis of FIG. 13 represents intervals of time. There may be ten rows in FIG. 13. The first row represents the gate drive signals of switches Q3A and Q2B ($V_{GS1}$ and $V_{GS5}$). The second row represents the gate drive signal of switch Q1A ($V_{GS3}$). The third row represents the gate drive signals of switches Q2A and Q3B ($V_{GS2}$ and $V_{GS4}$). The fourth row represents the gate drive signal of switch Q1B ($V_{GS6}$). The fifth row represents the voltage on the node SWD ($V_{SWD}$) The sixth row represents the voltage on the node SWA ($V_{SWA}$). The seventh row represents the voltage on the node SWC ($V_{SWC}$). The eighth row represents the voltage on the node SWB ($V_{SWB}$). The ninth row represents the current flowing through the inductor LB ($i_{LB}$). The tenth row represents the current flowing through the inductor LA ($i_{LA}$).

As shown in FIG. 13, the four different time intervals are T1, T2, T3 and T4. As shown in FIG. 13, T1 is from t0 to t1. T2 is from t1 to (Ts/2). T3 is from (Ts/2) to t3. T4 is from t3 to Ts.

During the first time interval (T1), the power switches Q3A, Q2B, and Q1A are turned on. The power switches Q2A, Q1B and Q3B are off. Power is delivered from the input power source Vin to the output capacitor Co and the system load connected at Vout through the power switch Q3A, the flying capacitor C1A and the inductor LB. The flying capacitor C1A is charging up and the current flowing through the inductor LB rises. The voltage at the node SWB is equal to the input voltage Vin minus the voltage across the flying capacitor C1A. Meanwhile, the energy stored in the flying capacitor C1B is discharged through the power switches Q1A, Q2B and the output inductor LB to the output capacitor Co and the system load at Vout. The flying capacitor C1B is connected between the switching node SWB and the ground. The voltage across the flying capacitor C1A is equal to the input voltage Vin minus the voltage across the flying capacitor C1B. The output inductor LA is discharging through the power switch Q1A. The current $i_{LA}$ flowing through the output inductor LA has a slew rate of Vout/L. L is the inductance of the output inductors LA and LB.

During the second time interval (T2), the power switch Q1B is turned on, and the power switch Q1A remains on while the rest of the power switches are off. No energy is transferred either between the input power source Vin and the output or between the flying capacitors C1A, C1B and the output. Both inductor currents are discharged to the output capacitor Co and the system load at Vout. Both inductors are discharged by current $i_{LA}$ and $i_{LB}$ at the slew rate of Vout/L, and the energy stored in the output inductors LA and LB is transferred to output capacitor Co and the system load at Vout.

During the third time interval (T3), the power switches Q2A, Q1B and Q3B are turned on, and the power switches Q3A, Q2B, and Q1A are off. Power is delivered from the input power source Vin to the output through the switch Q3B, the flying capacitor C1B and the inductor LA to the output capacitor Co and the system load at Vout. The flying capacitor C1B is charging up and the current flowing through the inductor LA rises. The voltage at node SWA is equal to the input voltage Vin minus the voltage across the flying capacitor C1B. Meanwhile, the energy stored in the flying capacitor C1A is discharged through power switches Q2A, Q1B and the output inductor LA to the output capacitor Co and the system load at Vout. The flying capacitor C1A is connected between the switching node SWA and ground. The voltage across the flying capacitor C1B is equal to the input voltage Vin minus the voltage across the flying capacitor C1A. The output inductor LB is discharging through the power switch Q1B at the slew rate of Vout/L.

During the fourth time interval (T4), the power switch Q1A is turned on, and the power switch Q1B remains on. Other power switches are turned off. No energy is transferred either between the input power source and the output or between the flying capacitors C1A, C1B and the output. Energy stored in both inductors is discharged to the output capacitor Co and the system load at Vout. Both inductors are discharged by current $i_{LA}$ and $i_{LB}$ at the slew rate of Vout/L.

It should be noted that the time intervals T1 and T3 are equal in duration, and the time intervals T2 and T4 are equal in duration for the operation described above. Under such operation condition, the following relationships can be obtained:

$$V(C1B) = V(C1A) = Vin/2 \qquad (1)$$

In Equation (1), V(C1B) and V(C1A) represent the average voltages across the flying capacitors C1B and C1A over one switching period, respectively. If the duty cycle at the switching nodes SWB and SWA is defined as D, and D is equal to (T1/Ts) or (T3/Ts), the output voltage Vout can be expressed as:

$$Vout = V(C1A) \cdot \frac{T1}{Ts} = V(C1B) \cdot \frac{T3}{Ts} = V(C1A) \cdot D = V(C1B) \cdot D = Vin \cdot \frac{D}{2} \qquad (2)$$

Equation (2) indicates that for a same voltage conversion ratio, the duty cycle of the hybrid dual-phase step-down power converter 400 is twice that of a buck converter. Furthermore, the maximum voltage the low side power switches are required to withstand is Vin/2, resulting in the utilization of half voltage rated power switches in comparison with the power switches of the buck converter. This means the total silicon area of the two low-side power switches is smaller than that of the buck converter with the same on resistance. Furthermore, since the voltage swing across the low-side power switches is only one half of the input voltage during each switching transition, a higher switching frequency becomes possible. Such a higher switching frequency helps to reduce the sizes of the output inductors and output filtering capacitors, thereby achieving a smaller PCB area and solution size.

Figure 14:
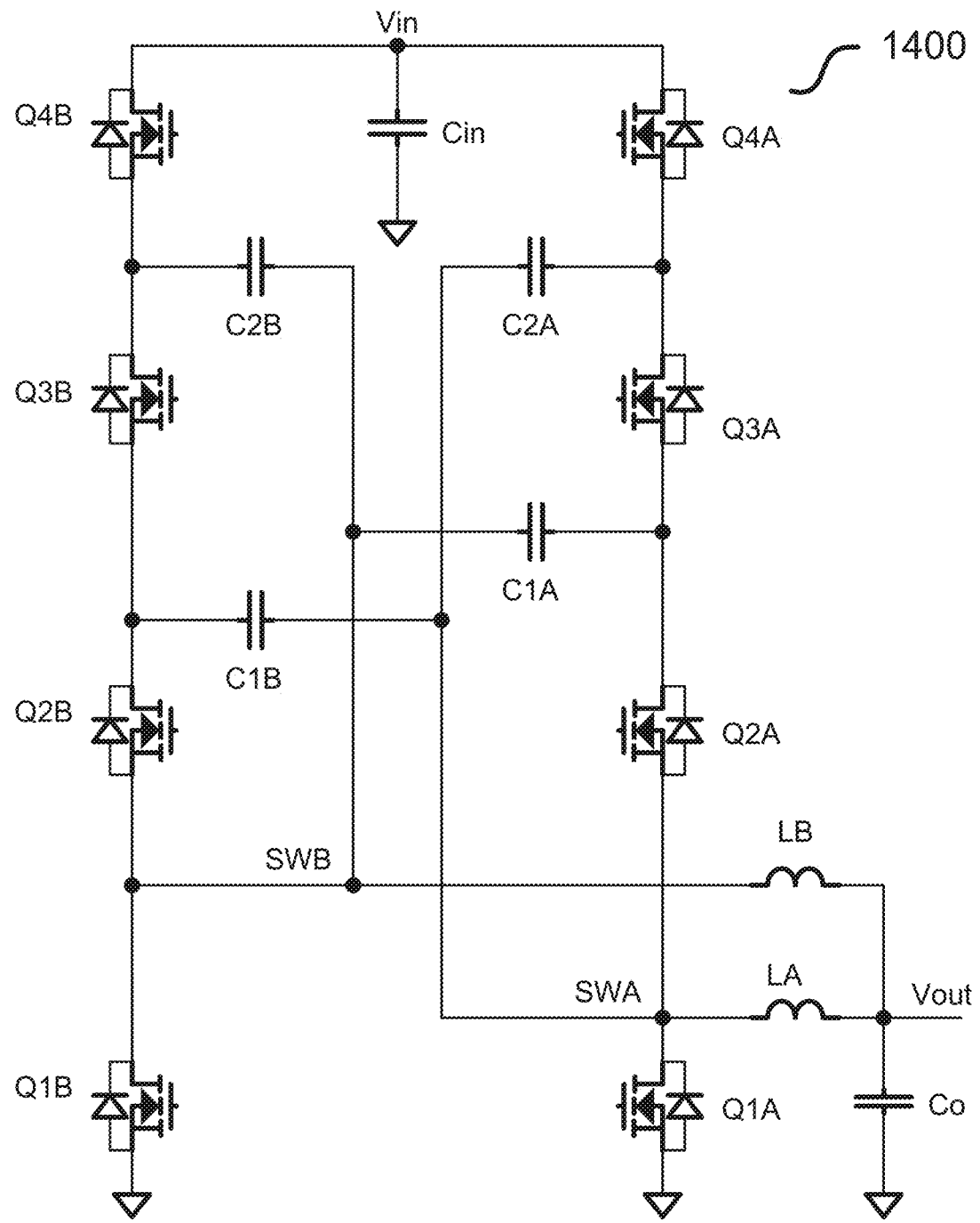
FIG. 14 illustrates a schematic diagram of a hybrid dual-phase step-down power converter having a voltage step-down ratio of 3/D in accordance with various embodiments of the present disclosure.

FIG. 14 illustrates a schematic diagram of a hybrid dual-phase step-down power converter having a voltage step-down ratio of 3/D in accordance with various embodiments of the present disclosure. The hybrid dual-phase step-down power converter 1400 comprises two phase legs. A first phase leg comprises power switches Q4A, Q3A, Q2A and Q1A, flying capacitors C1A and C2A and an output inductor LA. The power switches Q4A, Q3A, Q2A and Q1A are connected in series between the input power source Vin, and ground. The common node of the power switches Q2A and Q3A is connected to the first flying capacitor C1A. The common node of the power switches Q3A and Q4A is connected to the third flying capacitor C2A. The common node of the power switches Q1A and Q2A is connected to the output inductor LA, the second flying capacitor C1B and the third flying capacitor C2A. The common node of the power switches Q1A and Q2A is alternatively referred to as a SWA node as shown in FIG. 14.

The second phase leg comprises power switches Q4B, Q3B, Q2B and Q1B, flying capacitors C1B and C2B, and an output inductor LB. The power switches Q4B, Q3B, Q2B and Q1B are connected in series between the input power source Vin and ground. The common node of the power switches Q4B and Q3B is connected to the fourth flying capacitor C2B. The common node of the power switches Q3B and Q2B is connected to the second flying capacitor C1B. The common node of the power switches Q1B and Q2B is connected to the output inductor LB, the first flying capacitor C1A and the fourth flying capacitor C2B. The common node of the power switches Q1B and Q2B is alternatively referred to as a SWB node as shown in FIG. 14.

As shown in FIG. 14, both phases share the input filtering capacitor Cin and the output filtering capacitor Co. The operating principle of the hybrid dual-phase step-down power converter 1400 shown in FIG. 14 is similar to that of the hybrid dual-phase step-down power converter 400 shown in FIG. 12-13. In some embodiments, there are four time intervals in each switching cycle. During the first time interval T1, the power switches Q1A, Q3A, Q2B and Q4B are turned on, and the rest of the power switches are off. Power is transferred from the input power source Vin to the output capacitor Co and the system load at Vout through the power switch Q4B, the fourth flying capacitor C2B and the output inductor LB. The fourth flying capacitor C2B and the output inductor LB are charged. The energy stored in the second flying capacitor C1B is discharged to the output capacitor Co and the system load at Vout through the power switches Q1A and Q2B. The energy stored in the third flying capacitor C2A is discharged to the output capacitor Co and the system load at Vout through the first flying capacitor C1A, the power switches Q1A, Q3A and the output inductor LB. The first flying capacitor C1A is also charged.

During the second time interval T2, the power switch Q1B is turned on, and the power switch Q1A remains on. The rest of the power switches are off. There is no energy transferred either between the input power source Vin and the output or between the flying capacitors and the output. Both output inductors LA and LB are discharged to deliver energy to the output capacitor Co and the system load at Vout.

During the third time interval T3, the power switches Q1B, Q2A, Q3B and Q4A are turned on, and the rest of the power switches are turned off. The power is transferred from the input power source Vin to the output capacitor Co and the system load at Vout through the power switch Q4A, the third flying capacitor C2A and the output inductor LA. Both the third flying capacitor C2A and the output inductor LA are charged. The energy stored in the fourth flying capacitor C2B is discharged to the output through the power switches Q1B and Q3B, the second flying capacitor C1B and the output inductor LA. At the same time, the second flying capacitor C1B is charged. The energy stored in the first flying capacitor C1A is discharged to the output through the power switches Q1B and Q2A, and the output inductor LA.

During the fourth time interval T4, the power switch Q1A is turned on, and the power switch Q1B remain on. The rest of the power switches are off. No power is transferred either from the input power source Vin to the output or between the flying capacitors and the output. The energy stored in the output inductors LA and LB are discharged to the output capacitor Co and the system load at Vout through the power switches Q1A and Q1B respectively. Under this operation mode, the voltage down conversion ratio (Vin/Vout) is 3/D. D is the duty cycle of the hybrid dual-phase step-down power converter 1400. D is equal to T1/Ts or T3/Ts. Since the duty cycle D is not able to be higher than 50%, the output voltage regulation range of the hybrid dual-phase step-down power converter 1400 is between 0 and Vin/6.

FIG. 15 illustrates two equivalent circuit diagrams for the hybrid dual-phase step-down power converter shown in FIG. 14. For simplicity, the duty cycle D is set to be at the maximum duty cycle, which is 50%. In response to this maximum duty cycle, only two time intervals of the four time intervals described above are applicable as shown in FIG. 15. Circuit 1502 is the hybrid dual-phase step-down power converter 1400 shown in FIG. 14 configured to operate in the first time interval T1. Circuit 1504 is the hybrid dual-phase step-down power converter 1400 shown in FIG. 14 configured to operate in the third time interval T3. It should be noted that under a maximum duty cycle (50%), T2 and T4 are equal to zero. T1 and T3 form one switching period of the hybrid dual-phase step-down power converter 1400.

In the first time interval T1, the switches Q1A, Q2B, Q3A and Q4B are turned on, and the rest of the switches are turned off. There are three current paths connected to the switching node SWB (the input terminal of LB). As shown in FIG. 15, in the first current path, the input power source Vin is configured to provide current to the switching node SWB through the flying capacitor C2B. In the second current path, the series-connected flying capacitors C1A and C2A are configured to provide current to the switching node SWB. In the third current path, the flying capacitor C1B is configured to provide current to the switching node SWB In the third time interval T3, the switches Q1B, Q2A, Q3B and Q4A are turned on, and the rest of the switches are turned off. There are also three current paths connected to the switching node SWA (the input terminal of LA). As shown in FIG. 15, in the first current path, the input power source Vin is configured to provide current to the switching node SWA through the flying capacitor C2A. In the second current path, the series-connected flying capacitors C1B and C2B are configured to provide current to the switching node SWA. In the third current path, the flying capacitor C1A is configured to provide current to the switching node SWA.

According to the analysis of the hybrid dual-phase step down power converter 400, the hybrid dual-phase step-down power converter 1400 has a voltage conversion ratio equal to 6 when the duty cycle D is at 50%. The steady state voltages across flying capacitors C2A and C2B are two thirds of Vin. The steady state voltages across flying capacitors C1A and C1B are one third of Vin. The voltages on the switching nodes (SWA/SWB) are switching between ground and Vin/3.

Now assuming at the beginning of the first time interval T1, the voltages across the flying capacitors are at their steady state value. At the end of the first time interval, due to the discharging of C1B through LB to the Vout node and the system load connected to Vout, the voltage on the flying capacitor C1B drops down to (Vin/3)−ΔV. In some embodiments, ΔV is a voltage variation after the flying capacitor C1B finishes discharging at the end of the first time interval T1. Correspondingly, at the switching node SWB, the voltage drops to (Vin/3)−ΔΔV, and the voltage across the flying capacitor C2B is equal to Vin−V(SWB), which is (2Vin/3)+ΔV. In the current path having the flying capacitors C2A and C1A, assuming that the flying capacitors C1A and C2A have approximately the same capacitance, since the currents flowing through the flying capacitors C1A and C2A are the same, the voltage drop on the switching node SWB is distributed evenly between the flying capacitors C1A and C2A. In other words, the flying capacitor C2A is discharged to (2Vin/3)−(ΔV/2). The flying capacitor C1A is charged to (Vin/3)+(ΔV/2). In summary, at the end of the first time interval T1, the voltages across all flying capacitors can be expressed by the following equations:

$$V_{C2B} = Vin \times \frac{2}{3} + \Delta V \qquad (3)$$

-continued $$V_{C1B} = Vin \times \frac{1}{3} - \Delta V \quad (4)$$

$$V_{C2A} = Vin \times \frac{2}{3} - \frac{\Delta V}{2} \quad (5)$$

$$V_{C1A} = Vin \times \frac{1}{3} + \frac{\Delta V}{2} \quad (6)$$

With these voltages across the flying capacitors, at the beginning of the third time interval T3, the three current paths are reconfigured as shown in circuit 1504. The voltage applied to the switching node SWA from the first current path (from Vin to SWA through C2A) can be expressed as:

$$V_{SWA} = Vin - V_{C2A} = Vin \times \frac{1}{3} + \frac{\Delta V}{2} \quad (7)$$

The voltage applied to the switching node SWA from the second current path (from C2B and C1B to SWA) can be expressed as:

$$V_{SWA} = V_{C2B} - V_{C1B} = Vin \times \frac{1}{3} + 2\Delta V \quad (8)$$

The voltage applied to the switch node SWA from the third current path (from C1A to SWA) can be expressed as:

$$V_{SWA} = V_{C1A} = Vin \times \frac{1}{3} + \frac{\Delta V}{2} \quad (9)$$

As indicated by Equations (7), (8) and (9), the voltage from the second current path (Equation (8)) is higher than the voltage from the first and third current paths. The three current paths have different voltages at the SWA node. The presence of LA between the switching node SWA and Vout prevents a sudden change in the current provided to the Vout node and the load connected to Vout, while allows a sudden change in the voltage on the switching node SWA. As a result of having the voltage difference, charge transfer between flying capacitors will occur. In particular, the current path with two flying capacitors C1B and C2B connected in series charges the current paths with a single capacitor momentarily, thereby causing current spikes and the associated charge sharing losses.

This charge sharing loss can be a significant part of the power conversion loss of the hybrid dual-phase step-down power converter 1400. Especially, when the flying capacitor values are small with respect to the operating frequency of the converter, the charge sharing loss may be even worse. Additional switch states can be introduced to mitigate this issue by reducing the voltage differences among different current paths, which will be described below with respect to FIG. 16.

Figure 16:
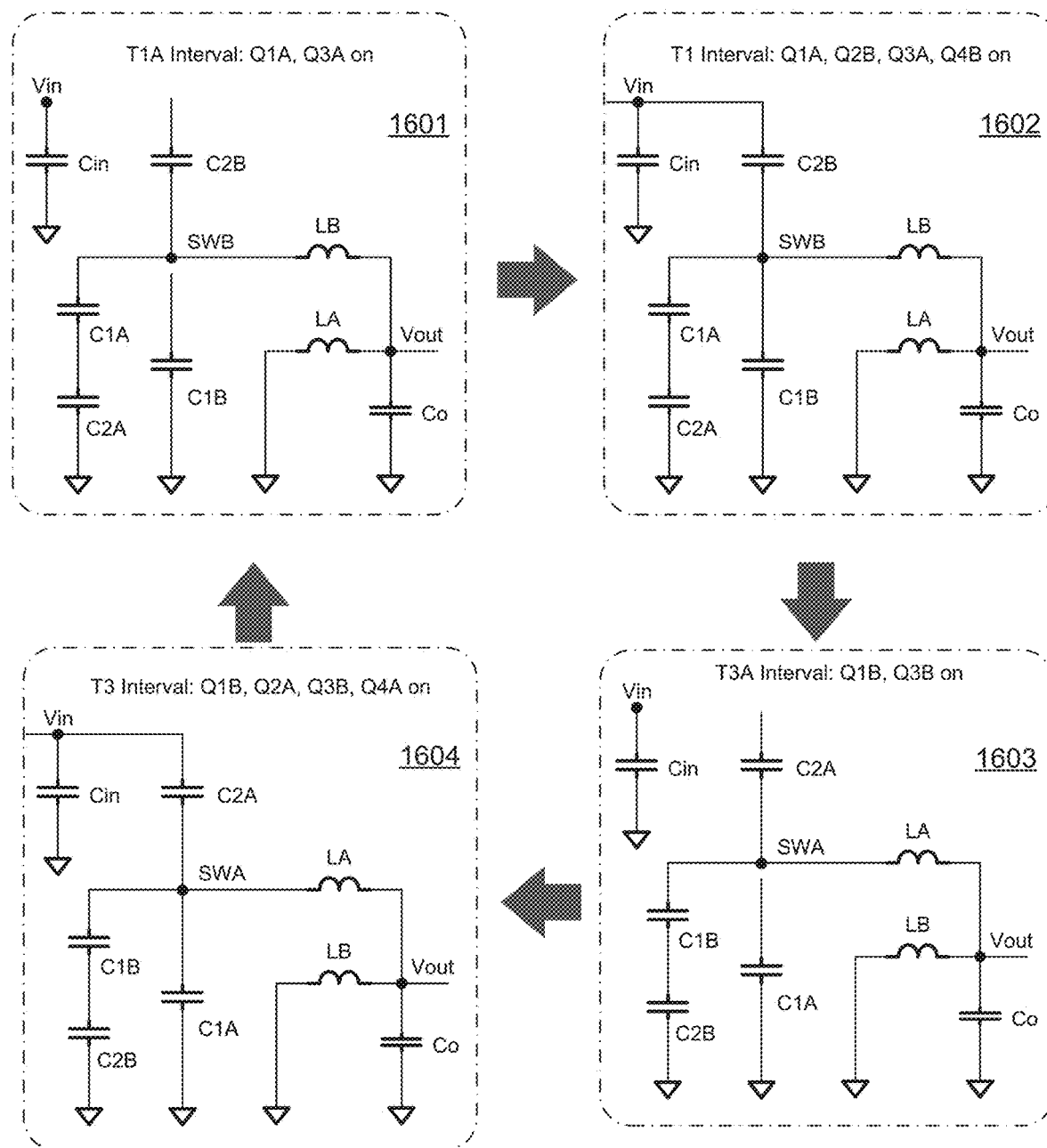
FIG. 16 illustrates four equivalent circuit diagrams for operating the hybrid dual-phase step-down power converter shown in FIG. 14 with two additional switch states in accordance with various embodiments of the present disclosure.

FIG. 16 illustrates four equivalent circuit diagrams for operating the hybrid dual-phase step-down power converter shown in FIG. 14 with two additional switch states in accordance with various embodiments of the present disclosure. The operating principle shown in FIG. 16 is similar to that shown in FIG. 15 except that two more switch states are added to prevent the power loss caused by charge transferring described above with respect to FIG. 15. As shown in FIG. 16, equivalent circuits 1601 and 1603 are used to describe the operating principle of the two additional switch states.

As shown in FIG. 16, a new control scheme extends the control of the hybrid dual-phase step-down power converter shown in FIG. 14 from two switch states (as shown in two equivalent circuits in FIG. 15) to four switch states including two additional switch states (as shown in the four equivalent circuits in FIG. 16).

In the T1 time interval, the operating principle of the circuit 1602 is similar to that of the circuit 1502 shown in FIG. 15, and hence is not discussed again. At the end of the T1 time interval, as indicated by Equations (7), (8) and (9), if the circuit is directly reconfigured as shown in circuit 1504, the voltage from the second current path (from series-connected C1B and C2B to SWA) would be higher than the voltage from the first current path (from Vin and C2A to SWA) and the voltage from the third current path (from C1A to SWA).

In order to eliminate this voltage mismatch, an additional circuit configuration state is added after the T1 time interval. This additional circuit configuration state is referred to as a T3A time interval as shown in FIG. 16. In this newly added time interval (T3A), the switches Q1B and Q3B are turned on, and the rest of the switches are turned off. In response to this system configuration, as shown in FIG. 16, the flying capacitors C1A is disconnected from SWA, and the flying capacitor C2A is disconnected from Vin. Only C1B and C2B are connected in series and further connected to SWA. The voltage across the series-connected flying capacitors C1B and C2B is discharged. At the beginning of the T3A time interval, the voltage across the series-connected C1B and C2B can be expressed as:

$$V_{C2B} - V_{C1B} = Vin \times \frac{1}{3} + 2\Delta V \quad (10)$$

At the end of the T3A time interval, the voltage across the series-connected C1B and C2B is discharged to a lower level, which can be expressed as:

$$V_{C2B} - V_{C1B} = Vin \times \frac{1}{3} + \frac{\Delta V}{2} \quad (11)$$

Equation (11) indicates the voltage across the series-connected C1B and C2B is discharged to a level equal to the voltage of the other two current paths. Once this condition is satisfied, C2A is connected to Vin, and C1A is connected to SWA at the same time to start the T3 time interval, as shown in circuit 1604.

The operating principle of the circuit 1601 for the T1A time interval is similar to that of the circuit 1603. Among the current paths connected to the switching node SWB during T1A time interval, the one having two flying capacitors connected in series (namely C1A and C2A) is connected to SWB first in the T1A time interval to discharge the voltage across C1A and C2A. The T1A time interval ends when the voltage across the series-connected flying capacitors C1A and C2A is equal to the voltage of the other current paths having a single flying capacitor (C2B in the first current path and C1B in the third current path). At the end of the T1A time interval, the T1 time interval starts again to repeat the four-state cycle.

With the newly added two switch states, the voltages from the three current paths at the beginning of T1 and T2 time intervals are equal to each other. As a result, sudden transfer of charges among the flying capacitors can be avoided. As a result of eliminating the charge sharing loss between the flying capacitors, the hybrid dual-phase step-down power converter 1400 can achieve high power conversion efficiency.

In a more general case, the duty cycle D is less than 50%. In consideration with the free-wheeling intervals (e.g., T2 and T4 shown in FIG. 13), the four time intervals (T1, T3A, T3 and T1A) described above turns into six time intervals, namely T1, T1A, T1B, T3, T3A and T3B. It should be noted that T1B and T3B are similar to T2 and T4 shown in FIG. 13. In these two time intervals, both inductors are discharged to provide power for the output capacitor and the system load connected to the output.

Figure 17:
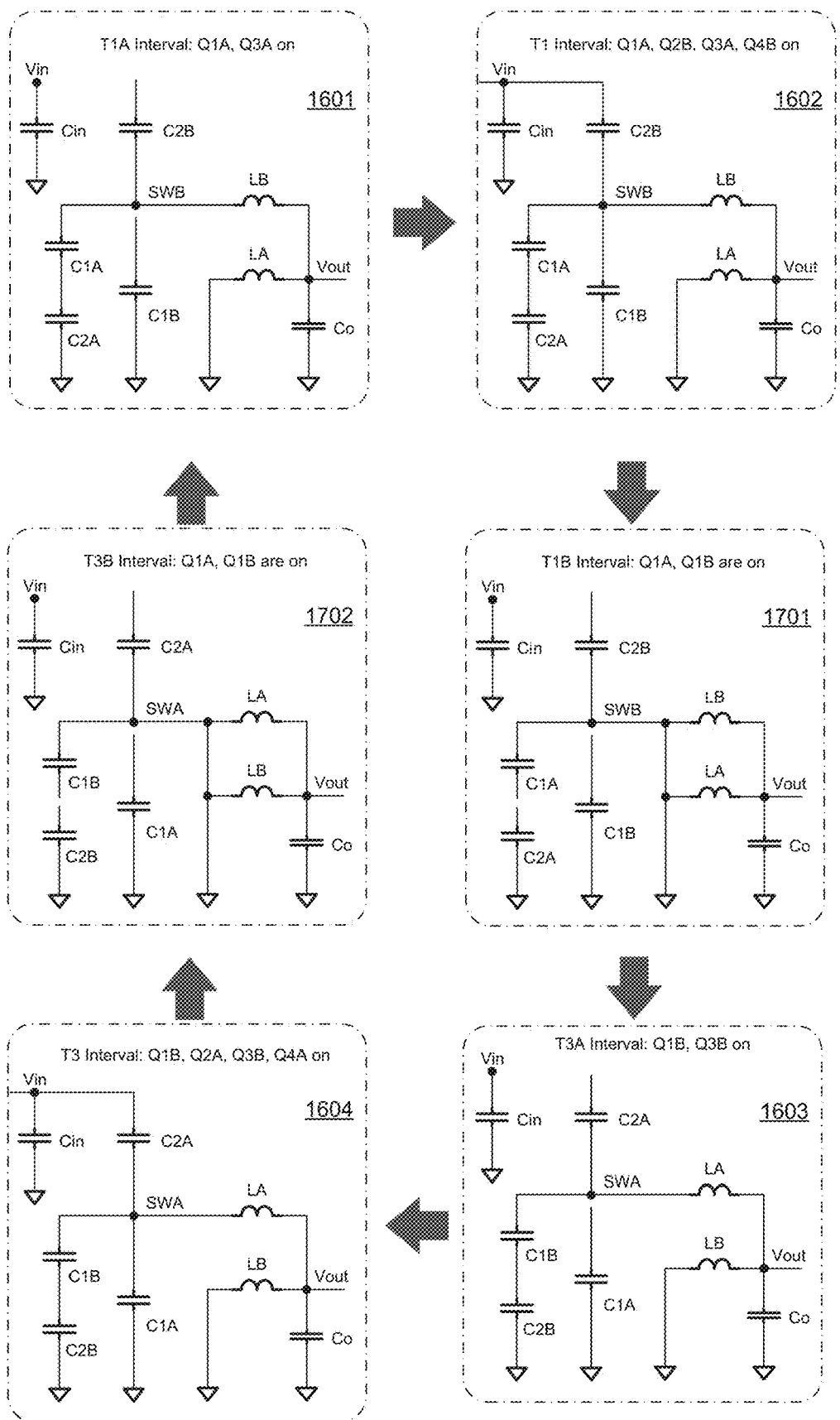
FIG. 17 illustrates six equivalent circuit diagrams for operating the hybrid dual-phase step-down power converter shown in FIG. 14 with four additional switch states in accordance with various embodiments of the present disclosure.

FIG. 17 illustrates six equivalent circuit diagrams for operating the hybrid dual-phase step-down power converter shown in FIG. 14 with four additional switch states in accordance with various embodiments of the present disclosure. Circuit 1701 is the equivalent circuit diagram when the hybrid dual-phase step-down power converter 1400 shown in FIG. 14 is configured to operate in the time interval T1B. Circuit 1702 is the equivalent circuit diagram when the hybrid dual-phase step-down power converter 1400 shown in FIG. 14 is configured to operate in the time interval T3B.

As shown in FIG. 17, the time interval T1B is in between the T1 time interval and the T3A time interval. The time interval T3B is in between the T3 time interval and the T1A time interval. During the T1B and T3B time intervals, both power switches Q1A and Q1B are turned on while all other power switches are off. No power is transferred either from the input power source Vin to the output or between the flying capacitors and the output. The energy stored in the output inductors LA and LB is discharged to the output capacitor Co and the system load at Vout through the power switches Q1A and Q1B, respectively.

Figure 18:
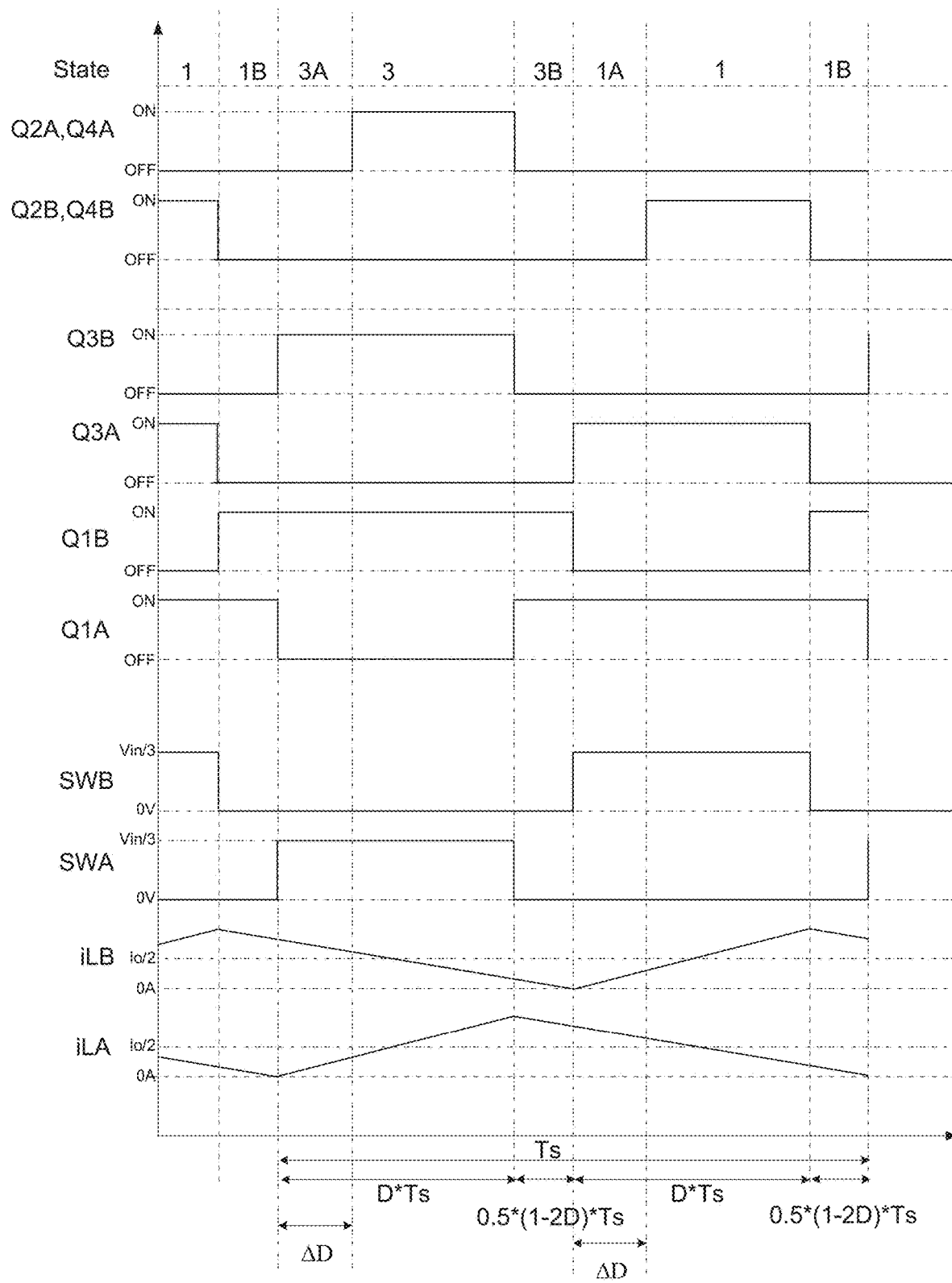
FIG. 18 illustrates the six different time intervals T1, T1B, T3A, T3, T3B and TA in accordance with various embodiments of the present disclosure.

FIG. 18 illustrates the six different time intervals T1, T1B, T3A, T3, T3B and T1A in accordance with various embodiments of the present disclosure. The horizontal axis of FIG. 18 represents intervals of time. There may be ten rows in FIG. 18. The first row represents the gate drive signals of switches Q2A and Q4A. The second row represents the gate drive signal of switches Q2B and Q4B. The third row represents the gate drive signal of switch Q3B. The fourth row represents the gate drive signal of switch Q3A. The fifth row represents the gate drive signal of switch Q1B. The sixth row represents the gate drive signal of switch Q1A. The seventh row represents the voltage on the switching node SWB. The eighth row represents the voltage on the switching node SWA. The ninth row represents the current flowing through the inductor LB ($i_{L_B}$). The tenth row represents the current flowing through the inductor LA ($i_{L_A}$).

As shown in FIG. 18, power switches Q3A and Q3B have a duty cycle of D. The bottom switches Q1B and Q1A have control signals complementary to the control signals of power switches Q3A and Q3B, respectively. The added switch states 3A and 1A has the same duration of ΔD. During ΔD, both the second from bottom (power switches Q2A, Q2B) and the top power switches (Q4A, Q4B) are turned off to allow the current paths with two flying capacitors in series to connect to the switching node SWA or the switching node SWB first to eliminate the voltage mismatch described above. As a result of having states 3A and 1A, the duty cycle of the power switches Q2A, Q2B, Q4A and Q4B is (D−ΔD).

In certain applications, a higher voltage step-down ratio is needed. The dual-phase hybrid step-down power converters shown in FIG. 12 and FIG. 14 can be uses as a basis for further expanding the circuit to achieve a higher voltage step-down ratio as described below with respect to FIGS. 19 and 20.

Figure 19:
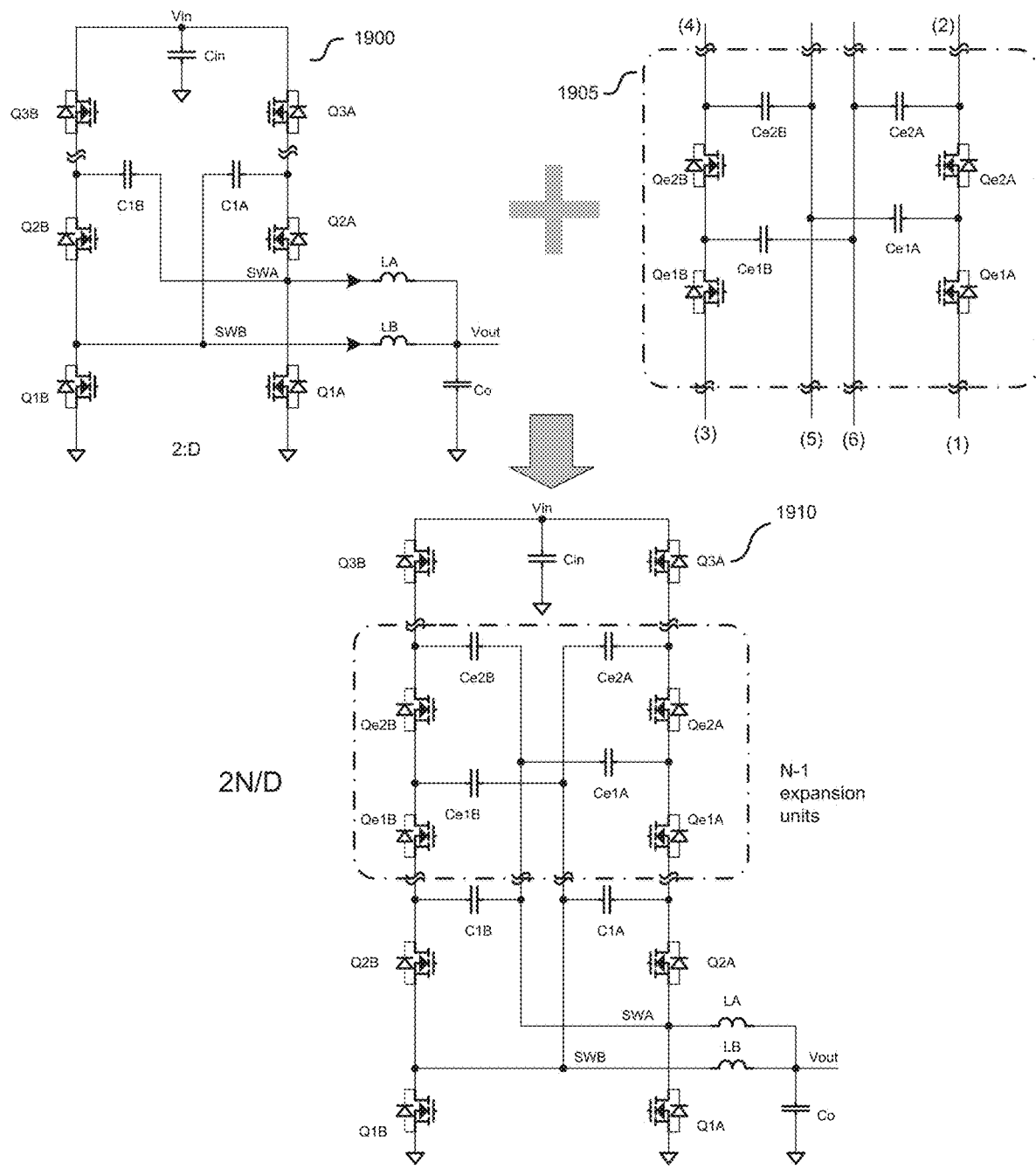
FIG. 19 illustrates a simplified schematic diagram of a hybrid dual-phase step-down power converter based on a combination of the hybrid dual-phase step-down power converter shown in FIG. 12 and an expansion circuit in accordance with various embodiments of the present disclosure.

FIG. 19 illustrates a simplified schematic diagram of a hybrid dual-phase step-down power converter based on a combination of the hybrid dual-phase step-down power converter shown in FIG. 12 and an expansion circuit in accordance with various embodiments of the present disclosure. The hybrid dual-phase step-down power converter shown in FIG. 12 has a voltage step down ratio of 2/D. This converter shown in FIG. 12 is depicted as a 2/D converter 1900 shown in FIG. 19. An expansion unit 1905 is also shown in FIG. 19. The hybrid dual-phase step-down power converter 1910 is based on the 2/D converter 1900 and the expansion unit 1905. As shown in FIG. 19, the hybrid dual-phase step-down power converter 1910 has a step down ratio of 2N/D. N is an integer number greater than 1.

The expansion unit 1905 comprises four power switches Qe1A, Qe1B, Qe2A and Qe2B, and four flying capacitors Ce1A, Ce1B, Ce2A and Ce2B. The power switches Qe1A and Qe2A are connected in series between a first terminal (1) and a second terminal (2) of the expansion unit 1905. Similarly, the power switches Qe1B and Qe2B are connected in series between a third terminal (3) and a fourth terminal (4) of the expansion unit 1905.

The flying capacitor Ce1A is connected between the common node of power switches Qe1A, Qe2A and a fifth terminal (5) of the expansion unit 1905. The flying capacitor Ce2A is connected between a second terminal (2) and a sixth terminal (6) of the expansion unit 1905. The flying capacitor Ce1B is connected between the common node of power switches Qe1B, Qe2B and the sixth terminal of the expansion unit 1905. The flying capacitor Ce2B is connected between the fourth terminal and the fifth terminal of the expansion unit 1905.

The hybrid dual-phase step-down power converter 1900 can be expanded by inserting the expansion unit 1905 between the second and third power switches from the bottom of each phase leg (e.g., between Q2B and Q3B, and between Q2A and Q3A). The first terminal of expansion unit 1905 is connected to the common node of the power switch Q2A and the flying capacitor C1A. The second terminal of expansion unit 1905 is connected to the power switch Q3A. The fifth terminal of the expansion unit 1905 is connected the switching node SWA. The third terminal of expansion unit 1905 is connected to the common node of power switch Q2B and flying capacitor C1B. The fourth terminal of expansion unit 1905 is connected to the power switch Q3B. The sixth terminal of the expansion unit 1905 is connected the switching node SWB. In some embodiments, when N−1 expansion units are inserted into the hybrid dual-phase step-down power converter 1900, the second terminal and the fourth terminal of the expansion unit 1905 shown in FIG. 19 are coupled to the power switches Q3A and Q3B, respectively through the other N−2 expansion units.

FIG. 19 also illustrates the expansion result based on the 2/D converter 1900 and the expansion unit 1905. As shown in FIG. 19, a converter having a step down ratio of 2N/D is depicted as a hybrid dual-phase step-down power converter 1910. N is a positive integer number (e.g., 1, 2, 3 . . . ). In some embodiments, N-1 copies of the expansion unit 1905 can be added to the 2/D converter 1900 using the method described above. In the hybrid dual-phase step-down power converter 1910 with a step down ratio 2N/D, there are (4N+2) power switches, (4N-2) flying capacitors, two output inductors, one input filtering capacitor, and one output filtering capacitor.

The operating principle of the hybrid dual-phase step-down power converter 1910 in FIG. 19 is similar to that of the hybrid dual-phase step-down power converter 1900. In some embodiments, there are four time intervals in each switching cycle. During the first time interval T1, the power switches Q1B, Q3B, Q2A and expansion switches Qe1B, Qe2A of each expansion unit 1905 are on, and the rest of the power switches are off. Power is transferred from the input power source Vin to the output capacitor Co and the system load at Vout through the power switch Q3B, the flying capacitor Ce2B of the expansion unit 1905 adjacent to power switch Q3B and the output inductor LA. Power is also transferred between the flying capacitor C1A and the output through the power switches Q1B, Q2A and the output inductor LA. In addition, through the power switch Q1B and the output inductor LA, power is also transferred between the series-connected flying capacitor pairs formed by the flying capacitor C1B and the rest of the flying capacitors of each of the expansion units 1905, and the capacitor Co and the system load at Vout. The energy stored in the output inductor LB is discharged to the output capacitor Co and the system load at Vout through the power switch Q1B.

During the second time interval T2, the power switch Q1A is turned on, and the power switch Q1B remains on. The rest of the power switches are off. The energy stored in the output inductors LA and LB is discharged to the output capacitor Co and the system load at Vout through the power switches Q1A and Q1B, respectively. No power is transferred either between the input power source Vin and the output or between the flying capacitors and the output.

During the third time interval T3, the power switches Q1A, Q3A, Q2B and expansion switches Qe1A, Qe2B of each expansion unit 1905 are on, and the rest of the power switches are off. Power is transferred from the input power source Vin to the output capacitor Co and the system load at Vout through the power switch Q3A, the flying capacitor Ce2A of the expansion unit 1905 adjacent to power switch Q3A and the output inductor LB. Power is also transferred between the flying capacitor C1B and the output through the power switch Q1A, Q2B and the output inductor LB. In addition, through the power switch Q1A and the output inductor LB, power is also transferred between the series-connected flying capacitor pairs formed by flying capacitor C1A and the rest of the flying capacitors of each of the expansion units 1905, and the capacitor Co and the system load at Vout. The energy stored in the output inductor LA is discharged to the output capacitor Co and the system load at Vout through the power switch Q1A.

During the fourth time interval T4, the power switch Q1B is turned on, and the power switch Q1A remains on. The rest of the power switches are off. The energy stored in the output inductors LA and LB is discharged to the output capacitor Co and the system load at Vout through the power switches Q1A and Q1B, respectively. No power is transferred between the input power source Vin and the output as well as between the flying capacitors and the output.

The operation cycle repeats once again at the end of the fourth time interval T4. Under the operation described above, the output voltage regulation of the hybrid dual-phase step-down power converter 1910 is Vin×D/(2N). It should be noted the D is in a range from 0 to 0.5. In other words, the output voltage of the hybrid dual-phase step-down power converter 1910 is in a range from 0 V to Vin/(4N).

It should be noted that the expansion method described above with respect to FIG. 19 is applicable to all hybrid dual-phase step-down power converters having a step down ratio of 2N/D. That is, the step down ratio is an even number multiplied by (1/D). For the cases of the step down ratio being an odd number multiplied by (1/D), the circuit expansion can be obtained based on the hybrid dual-phase step-down power converter with a step down ratio of 3/D illustrated in FIG. 14.

Figure 20:
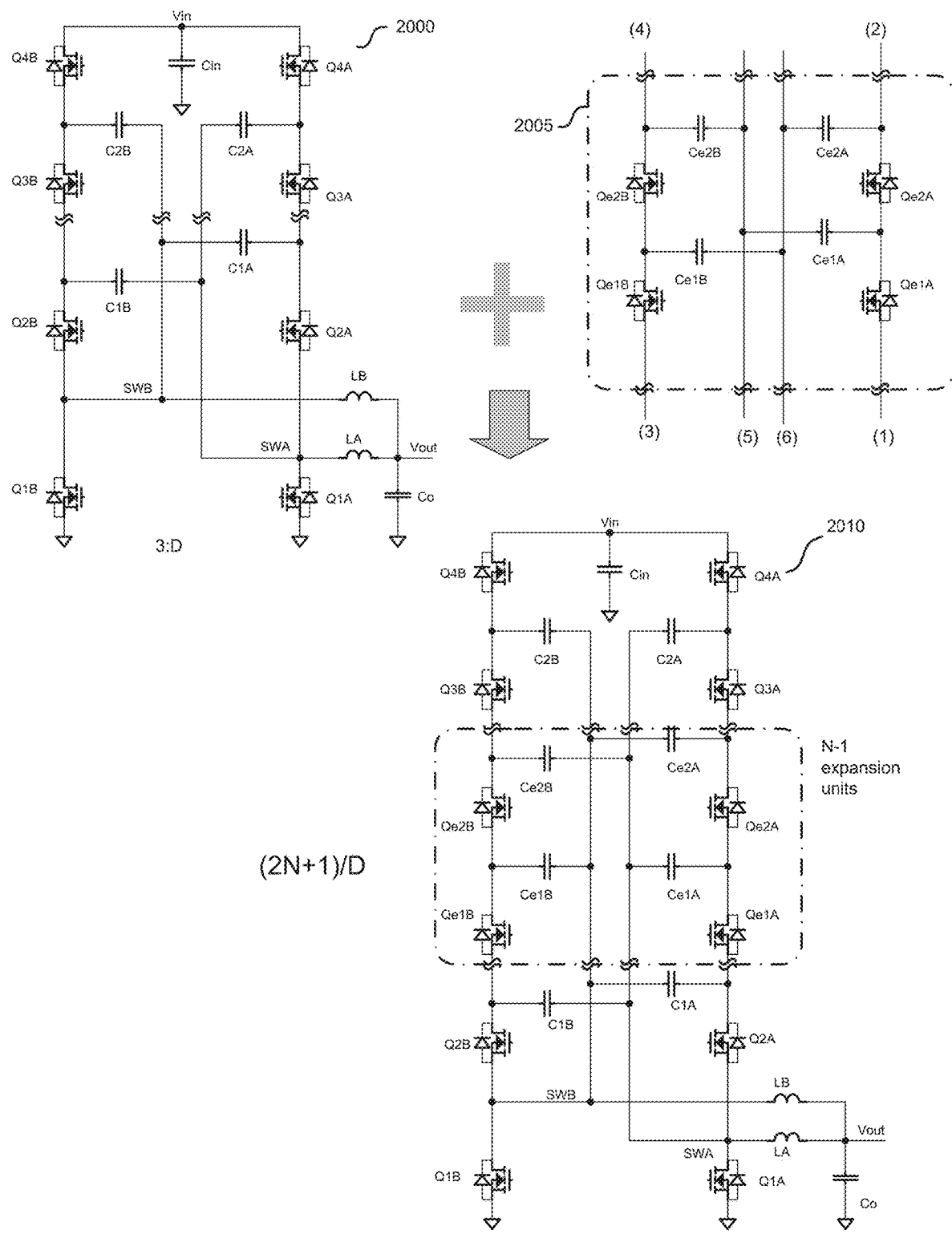
FIG. 20 illustrates a simplified schematic diagram of a hybrid dual-phase step-down power converter based on a combination of the hybrid dual-phase step-down power converter shown in FIG. 14 and an expansion circuit in accordance with various embodiments of the present disclosure.

FIG. 20 illustrates a simplified schematic diagram of a hybrid dual-phase step-down power converter based on a combination of the hybrid dual-phase step-down power converter shown in FIG. 14 and an expansion circuit in accordance with various embodiments of the present disclosure. The hybrid dual-phase step-down power converter shown in FIG. 14 has a voltage step down ratio of 3/D. This converter shown in FIG. 14 is depicted as a 3/D converter 2000. An expansion unit 2005 is also shown in FIG. 20.

As shown in FIG. 20, the hybrid dual-phase step-down power converter 2000 also can be expanded to achieve a higher voltage step-down ratio by inserting the expansion unit 2005 between the second and third power switches from the bottom of each phase leg (e.g., between Q2B and Q3B and between Q2A and Q3A).

A first terminal (1) of the expansion unit 2005 is connected to the common node of the power switch Q2A and the flying capacitor C1A. A second terminal (2) of the expansion unit 2005 is connected to the power switch Q3A. A fifth terminal (5) of the expansion unit 2005 is connected the switching node SWA. A third terminal (3) of the expansion unit 2005 is connected to the common node of the power switch Q2B and the flying capacitor C1B. The fourth terminal (4) of expansion unit 2005 is connected to the power switch Q3B. A sixth terminal (6) of the expansion unit 2005 is connected to the switching node SWB. In some embodiments, when N-1 expansion units are inserted into the hybrid dual-phase step-down power converter 2000, the second terminal and the fourth terminal of the expansion unit 2005 shown in FIG. 20 are coupled to the power switch Q3A and the power switch Q3B, respectively through the other N-2 expansion units.

FIG. 20 also illustrates the expansion result based on the 3/D converter 2000 and expansion unit 2005. As shown in FIG. 20, a converter having a step down ratio of (2N+1)/D is depicted as a hybrid dual-phase step-down power converter 2010. N is a positive integer number (e.g., 1, 2, 3...). In some embodiments, N-1 copies of the expansion unit 2005 can be added to the 3/D converter 2000 using the method described above to achieve a voltage step-down ratio of (2N+1)/D. In the hybrid dual-phase step-down power converter 2010 with a step down ratio (2N+1)/D, there are a total 4(N+1) power switches, 4×N flying capacitors, two output inductors, one input filtering capacitor, and one output filtering capacitor.

The operating principle of the hybrid dual-phase step-down power converter 2010 in FIG. 20 is similar to that of the hybrid dual-phase step-down power converter 2000. In some embodiments, there are four time intervals in each switching cycle.

During the first time interval T1, the power switches Q1A, Q2B, Q3A, Q4B and expansion switches Qe1A, Qe2B of each expansion unit 2005 are on, and the rest of the power switches are off. Power is transferred from the input power source Vin to the output capacitor Co and the system load at Vout through the power switch Q4B, the flying capacitor C2B and the output inductor LB. Power is also transferred between the flying capacitor C1B and the output through the power switch Q1A, Q2B and the output inductor LB. In addition, through the power switch Q1A and the output inductor LB, power is transferred between the multiple pairs of series-connected flying capacitors formed by the flying capacitors C1A, C2A and all of the flying capacitors of each of the expansion units 2005, and the capacitor Co and the system load at Vout. The energy stored in the output inductor LA is discharged to the output capacitor Co and the system load at Vout through the power switch Q1A.

During the second time interval T2, the power switch Q1B is turned on, and the power switch Q1A remains on.

The rest of the power switches are off. The energy stored in the output inductors LA and LB is discharged to the output capacitor Co and the system load at Vout through the power switches Q1A and Q1B, respectively. No power is transferred either between the input power source Vin and the output or between the flying capacitors and the output.

During the third time interval T3, the power switches Q1B, Q2A, Q3B, Q4A and expansion switches Qe1B, Qe2A of each expansion unit 2005 are on, and the rest of the power switches are off. Power is transferred from the input power source Vin to the output capacitor Co and the system load at Vout through the power switch Q4A, the flying capacitor C2A and the output inductor LA. Power is also transferred between the flying capacitor C1A and the output through the power switch Q1B, Q2A and the output inductor LA. In addition, through the power switch Q1B and the output inductor LA, power is transferred between the multiple pairs of series-connected flying capacitors formed by the flying capacitors C1B, C2B and all of the flying capacitors of each of the expansion units 2005, and the capacitor Co and the system load at Vout. The energy stored in the output inductor LB is discharged to the output capacitor Co and the system load at Vout through the power switch Q1B.

During the fourth time interval T4, the power switch Q1A is turned on, and the power switch Q1B remains on. The rest of the power switches are off. The energy stored in the output inductors LA and LB are discharged to the output capacitor Co and the system load at Vout through the power switches Q1A and Q1B, respectively. No power is transferred between the input power source Vin and the output as well as between the flying capacitors and the output.

The operation cycle repeats once again at end of the fourth time interval T4. Under the operation described above, the output voltage regulation of the hybrid dual-phase step-down power converter 2010 is (Vin×D)/(2N+1). It should be noted the D is in a range from 0 to 0.5. In other words, the output voltage of the hybrid dual-phase step-down power converter 2010 is in a range from 0 V to Vin/(4N+2).

In some implementations, in order to avoid excessive charge sharing losses due to uneven distribution of the voltages among different current paths, similar method of delaying the discharging of the current paths with only one flying capacitor can be applied to the expanded hybrid dual-phase step down converters such as the converter 1910 shown in FIG. 19 and the converter 2010 shown in FIG. 20. Basically, two additional states can be added in between time intervals T4 and T1, or T2 and T3, where only the current paths with two flying capacitors connected in series are discharged to the output, while the discharging of the current paths with only one flying capacitor is delayed to the start of time intervals T1 and T3. In the case of converters with a step-down ratio equal to an even number multiplied by 1/D (e.g., converter 1910), the power switch pairs configured with the delayed turn on time is the top power switch of one phase leg and the second from bottom power switch of the other phase leg, that is Q3B and Q2A, or Q3A and Q2B shown in FIG. 19. In the case of converters with a step-down ratio equal to an odd number multiplied by 1/D (e.g., converter 2010), the power switch pairs configured with a delayed turn on time is the top power switch and the second from bottom power switch of the same phase leg, that is Q4B and Q2B, or Q4A and Q2A shown in FIG. 20.

The hybrid dual-phase step-down power converter 2000 and the expanded hybrid dual-phase step-down power converters 2010 and 1910 can also be configured to operate as a hybrid dual-phase step-up power converter, where the Vout terminal is configured as an input terminal, and Vin terminal is configured as an output. With the same power switch control schemes described, when a DC voltage is applied to Vout terminal, at Vin terminal, an output voltage of 3/D, 2N/D and (2N+1)/D times the DC voltage can be achieved at the Vin terminal.

In accordance with an embodiment, a hybrid dual-phase step-down power converter comprises a first phase comprising a plurality of first phase switches connected in series between an input power source and ground, a second phase comprising a plurality of second phase switches connected in series between the input power source and ground, and a first flying capacitor of the first phase and a first flying capacitor of the second phase cross-coupled between the first phase and the second phase, wherein switches of the first phase and switches of the second phase are configured such that a ratio of an input voltage of the hybrid dual-phase step-down power converter to an output voltage of the hybrid dual-phase step-down power converter is equal to N/D, and wherein N is an integer, and D is a duty cycle of the hybrid dual-phase step-down power converter.

In accordance with another embodiment, a method comprises providing a hybrid dual-phase step-down power converter comprising a first phase comprising a plurality of first phase switches connected in series between an input power source and ground, a second phase comprising a plurality of second phase switches connected in series between the input power source and ground, and a first flying capacitor of the first phase and a first flying capacitor of the second phase cross-coupled between the first phase and the second phase, and configuring switches of the first phase and switches of the second phase such that a ratio of an input voltage of the hybrid dual-phase step-down power converter to an output voltage of the hybrid dual-phase step-down power converter is equal to N/D, and wherein N is an integer, and D is a duty cycle of the hybrid dual-phase step-down power converter.

When N is equal to 2, the hybrid dual-phase step-down power converter comprises a first switch, a second switch and a third switch connected in series between ground and the input power source, a fourth switch, a fifth switch and a sixth switch connected in series between ground and the input power source, a first flying capacitor connected to a common node of the first switch and the second switch, and a common node of the fifth switch and the sixth switch, a second flying capacitor connected to a common node of the fourth switch and the fifth switch, and a common node of the second switch and the third switch, a first inductor connected between the common node of the first switch and the second switch and an output terminal of the hybrid dual-phase step-down power converter, and a second inductor connected between the common node of the fourth switch and the fifth switch and the output terminal of the hybrid dual-phase step-down power converter.

The method further comprises configuring the hybrid dual-phase step-down power converter to operate in four different time intervals with the duty cycle in a range from 0% to 50%, in a first time interval, configuring the first switch, the third switch and the fifth switch to be turned on, and configuring the second switch, the fourth switch and the sixth switch to be turned off, in a second time interval, configuring the first switch and the fourth switch to be turned on, and configuring the third switch, the second switch, the sixth switch and the fifth switch to be turned off, in a third time interval, configuring the first switch, the third switch and the fifth switch to be turned off, and configuring the second switch, the fourth switch and the sixth switch to be turned on, and in a fourth time interval, configuring the first switch and the fourth switch to be turned on, and configuring the third switch, the second switch, the sixth switch and the fifth switch to be turned off.

When N is equal to 3, the hybrid dual-phase step-down power converter comprises the first phase comprising a first switch, a second switch, a third switch and a fourth switch connected in series between ground and the input power source, the second phase comprising a fifth switch, a sixth switch, a seventh switch and an eighth switch connected in series between ground and the input power source, a first flying capacitor of the first phase connected to a common node of the second switch and the third switch, and a common node of the fifth switch and the sixth switch, a second flying capacitor of the first phase connected to a common node of the first switch and the second switch, and a common node of the third switch and the fourth switch, a first flying capacitor of the second phase connected to a common node of the sixth switch and the seventh switch, and the common node of the first switch and the second switch, a second flying capacitor of the second phase connected to the common node of the fifth switch and the sixth switch, and a common node of the seventh switch and the eighth switch, a first inductor connected between the common node of the first switch and the second switch and an output terminal of the hybrid dual-phase step-down power converter and a second inductor connected between the common node of the fifth switch and the sixth switch and the output terminal of the hybrid dual-phase step-down power converter.

The method further comprises configuring the hybrid dual-phase step-down power converter to operate in four different time intervals with the duty cycle in a range from 0% to 50%, in a first time interval, configuring the first switch, the third switch, the sixth switch and the eighth switch to be turned on, and configuring the second switch, the fourth switch, the fifth switch and the seventh switch to be turned off, in a second time interval, configuring the fifth switch and the first switch to be turned on, and configuring the seventh switch, the second switch, the third switch, the fourth switch, the sixth switch and the eighth switch to be turned off, in a third time interval, configuring the first switch, the third switch, the sixth switch and the eighth switch to be turned off, and configuring the second switch, the fourth switch, the fifth switch and the seventh switch to be turned on, and in a fourth time interval, configuring the first switch and the fifth switch to be turned on, and configuring the third switch, the second switch, the seventh switch, the fourth switch, the sixth switch and the eighth switch to be turned off.

The method further comprises configuring a current path having two flying capacitors connected in series to be discharged to a voltage level equal to a voltage of two current paths having one flying capacitor before configuring the two current paths to start discharging in parallel with the current path having two flying capacitors connected in series to prevent charge transferring between flying capacitors from occurring.

The method further comprises applying an input voltage to an output terminal of the hybrid dual-phase step-down power converter, coupling a load to an input terminal of the hybrid dual-phase step-down power converter, and configuring the switches of the first phase and the switches of the second phase such that the hybrid dual-phase step-down power converter is configured to operate a step-up operation mode, and a ratio of a voltage across the load to the input voltage is equal to N/D.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A hybrid dual-phase step-down power converter comprising:
   a first phase comprising a plurality of first phase switches connected in series between an input power source and ground;
   a second phase comprising a plurality of second phase switches connected in series between the input power source and ground; and
   a first flying capacitor of the first phase and a first flying capacitor of the second phase cross-coupled between the first phase and the second phase, wherein switches of the first phase and switches of the second phase are configured such that a ratio of an input voltage of the hybrid dual-phase step-down power converter to an output voltage of the hybrid dual-phase step-down power converter is equal to N/D, and wherein N is an integer, and D is a duty cycle of the hybrid dual-phase step-down power converter.

2. The hybrid dual-phase step-down power converter of claim 1, further comprising:
   a first inductor connected between a lowest switch common node of the plurality of first phase switches and an output terminal of the hybrid dual-phase step-down power converter; and
   a second inductor connected between a lowest switch common node of the plurality of second phase switches and the output terminal of the hybrid dual-phase step-down power converter.

3. The hybrid dual-phase step-down power converter of claim 2, wherein:
   the first flying capacitor of the first phase is connected between the first phase and the lowest switch common node of the plurality of second phase switches; and
   the first flying capacitor of the second phase is connected between the second phase and the lowest switch common node of the plurality of first phase switches.

4. The hybrid dual-phase step-down power converter of claim 2, wherein:
   the first phase comprises a third switch, a second switch and a first switch connected in series between the input power source and ground, and wherein a common node of the second switch and the first switch is the lowest switch common node of the plurality of first phase switches;

the second phase comprises a sixth switch, a fifth switch and a fourth switch connected in series between the input power source and ground, and wherein a common node of the fifth switch and the fourth switch is the lowest switch common node of the plurality of second phase switches;

the first flying capacitor of the first phase is connected to a common node of the third switch and the second switch, and the common node of the fifth switch and the fourth switch;

the first flying capacitor of the second phase is connected to a common node of the sixth switch and the fifth switch, and the common node of the second switch and the first switch;

the first inductor is connected between the common node of the second switch and the first switch and the output terminal of the hybrid dual-phase step-down power converter; and the second inductor is connected between the common node of the fifth switch and the fourth switch and the output terminal of the hybrid dual-phase step-down power converter.

5. The hybrid dual-phase step-down power converter of claim 4, wherein:

in a first time interval, the first switch, the third switch and the fifth switch are configured to be turned on, and the second switch, the fourth switch and the sixth switch are configured to be turned off, and wherein the first inductor is discharged and the second inductor is charged;

in a second time interval, the first switch and the fourth switch are configured to be turned on, and the third switch, the second switch, the sixth switch and the fifth switch are configured to be turned off, and wherein the first inductor is discharged and the second inductor is discharged;

in a third time interval, the first switch, the third switch and the fifth switch are configured to be turned off, and the second switch, the fourth switch and the sixth switch are configured to be turned on, and wherein the first inductor is charged and the second inductor is discharged; and in a fourth time interval, the first switch and the fourth switch are configured to be turned on, and the third switch, the second switch, the sixth switch and the fifth switch are configured to be turned off, and wherein the first inductor is discharged and the second inductor is discharged.

6. The hybrid dual-phase step-down power converter of claim 4, wherein:

the first phase, the second phase, the first flying capacitor of the first phase, the first flying capacitor of the second phase, the first inductor and the second inductor form a power converter having a ratio of an input voltage to an output voltage equal to 2/D.

7. The hybrid dual-phase step-down power converter of claim 6, wherein:

the power converter is configured to operate with a duty cycle in a range from 0% to 50%; and as a result of having the duty cycle, an output voltage of the power converter is regulated in a range from 0 V to one fourth of an input voltage applied to the power converter.

8. The hybrid dual-phase step-down power converter of claim 1, further comprising:

a first inductor connected between a lowest switch common node of the plurality of first phase switches and an output terminal of the hybrid dual-phase step-down power converter;

a second inductor connected between a lowest switch common node of the plurality of second phase switches and the output terminal of the hybrid dual-phase step-down power converter; and a second flying capacitor of the first phase and a second flying capacitor of the second phase, wherein:

the first phase comprises a first switch, a second switch, a third switch and a fourth switch connected in series between ground and the input power source;

the second phase comprises a fifth switch, a sixth switch, a seventh switch and an eighth switch connected in series between ground and the input power source;

the first flying capacitor of the first phase is connected to a common node of the second switch and the third switch, and the common node of the fifth switch and the sixth switch;

the second flying capacitor of the first phase is connected to a common node of the fourth switch and the third switch, and the common node of the first switch and the second switch;

the first flying capacitor of the second phase is connected to a common node of the sixth switch and the seventh switch, and the common node of the first switch and the second switch;

the second flying capacitor of the second phase is connected to a common node of the seventh switch and the eighth switch, and the common node of the fifth switch and the sixth switch;

the first inductor is connected between the common node of the first switch and the second switch and the output terminal of the hybrid dual-phase step-down power converter; and the second inductor is connected between the common node of the fifth switch and the sixth switch and the output terminal of the hybrid dual-phase step-down power converter.

9. The hybrid dual-phase step-down power converter of claim 8, wherein:

the first phase, the second phase, the first flying capacitor of the first phase, the second flying capacitor of the first phase, the first flying capacitor of the second phase, the second flying capacitor of the second phase, the first inductor and the second inductor form a power converter having a ratio of an input voltage to an output voltage equal to 3/D.

10. The hybrid dual-phase step-down power converter of claim 1, further comprising (K−1) expansion units, wherein one expansion unit of the (K−1) expansion units comprises:

a first expansion switch and a second expansion switch connected in series between a first terminal and a second terminal of the one expansion unit;

a third expansion switch and a fourth expansion switch connected in series between a third terminal and a fourth terminal of the one expansion unit;

a first expansion capacitor connected between a common node of the first expansion switch and the second expansion switch, and a fifth terminal of the one expansion unit;

a second expansion capacitor connected between the second terminal and a sixth terminal of the one expansion unit;

a third expansion capacitor connected between a common node of the third expansion switch and the fourth expansion switch, and the sixth terminal of the one expansion unit; and a fourth expansion capacitor connected between the fourth terminal and the fifth terminal of the one expansion unit.

11. The hybrid dual-phase step-down power converter of claim 10, further comprising:

a first inductor connected between a lowest switch common node of the plurality of first phase switches and an output terminal of the hybrid dual-phase step-down power converter; and a second inductor connected between a lowest switch common node of the plurality of second phase switches and the output terminal of the hybrid dual-phase step-down power converter, wherein:

the first phase comprises a third switch, a second switch and a first switch coupled in series between the input power source and ground;

the second phase comprises a sixth switch, a fifth switch and a fourth switch coupled in series between the input power source and ground;

the first flying capacitor of the first phase is connected to the third switch, and the common node of the fifth switch and the fourth switch;

the first flying capacitor of the second phase is connected to the sixth switch, and the common node of the second switch and the first switch;

the first inductor is connected between the common node of the second switch and the first switch and the output terminal of the hybrid dual-phase step-down power converter;

the second inductor is connected between the common node of the fifth switch and the fourth switch and the output terminal of the hybrid dual-phase step-down power converter;

the first terminal of the one expansion unit is connected to a common node of the second switch and the first flying capacitor of the first phase;

the second terminal of the one expansion unit is coupled to the third switch through (K−2) expansion units;

the fifth terminal of the one expansion unit is connected to the common node of the first switch and the second switch;

the third terminal of the one expansion unit is connected to a common node of the fifth switch and the first flying capacitor of the second phase;

the fourth terminal of the one expansion unit is coupled to the sixth switch through (K−2) expansion units; and the sixth terminal of the one expansion unit is connected to a common node the fourth switch and the fifth switch.

12. The hybrid dual-phase step-down power converter of claim 11, wherein:

after the (K−1) expansion units have been added into the hybrid dual-phase step-down power converter, the ratio of an input voltage of the hybrid dual-phase step-down power converter to an output voltage of the hybrid dual-phase step-down power converter is equal to 2K/D, and wherein K is an integer, and D is the duty cycle of the hybrid dual-phase step-down power converter.

13. The hybrid dual-phase step-down power converter of claim 1, further comprising:

(K−1) expansion units, wherein one expansion unit of the (K−1) expansion units comprises:

a first expansion switch and a second expansion switch connected in series between a first terminal and a second terminal of the one expansion unit;

a third expansion switch and a fourth expansion switch connected in series between a third terminal and a fourth terminal of the one expansion unit;

a first expansion capacitor connected between a common node of the first expansion switch and the second expansion switch, and a fifth terminal of the one expansion unit;

a second expansion capacitor connected between the second terminal and a sixth terminal of the one expansion unit;

a third expansion capacitor connected between a common node of the third expansion switch and the fourth expansion switch, and the sixth terminal of the one expansion unit; and a fourth expansion capacitor connected between the fourth terminal and the fifth terminal of the one expansion unit;

a first inductor connected between a lowest switch common node of the plurality of first phase switches and an output terminal of the hybrid dual-phase step-down power converter;

a second inductor connected between a lowest switch common node of the plurality of second phase switches and the output terminal of the hybrid dual-phase step-down power converter; and a second flying capacitor of the first phase and a second flying capacitor of the second phase, wherein:

the first phase comprises a first switch, a second switch, a third switch and a fourth switch coupled in series between ground and the input power source;

the second phase comprises a fifth switch, a sixth switch, a seventh switch and an eighth switch coupled in series between ground and the input power source;

the first flying capacitor of the first phase is connected to the second switch, and the common node of the fifth switch and the sixth switch;

the second flying capacitor of the first phase is connected to a common node of the fourth switch and the third switch, and the common node of the first switch and the second switch;

the first flying capacitor of the second phase is connected to the sixth switch, and the common node of the first switch and the second switch;

the second flying capacitor of the second phase is connected to a common node of the seventh switch and the eighth switch, and the common node of the fifth switch and the sixth switch;

the first inductor is connected between the common node of the first switch and the second switch and the output terminal of the hybrid dual-phase step-down power converter;

the second inductor is connected between the common node of the fifth switch and the sixth switch and the output terminal of the hybrid dual-phase step-down power converter;

the first terminal of the one expansion unit is connected to a common node of the second switch and the first flying capacitor of the first phase;

the second terminal of the one expansion unit is coupled to the third switch through (K−2) expansion units;

the fifth terminal of the one expansion unit is connected to the common node of the first switch and the second switch;

the third terminal of the one expansion unit is connected to a common node of the sixth switch and the first flying capacitor of the second phase;

the fourth terminal of the one expansion unit is coupled to the seventh switch through (K−2) expansion units; and the sixth terminal of the one expansion unit is connected to a common node the fifth switch and the sixth switch.

14. The hybrid dual-phase step-down power converter of claim 13, wherein:

after the (K−1) expansion units have been added into the hybrid dual-phase step-down power converter, the ratio of an input voltage of the hybrid dual-phase step-down power converter to an output voltage of the hybrid dual-phase step-down power converter is equal to (2K+1)/D, and wherein K is an integer, and D is the duty cycle of the hybrid dual-phase step-down power converter.

15. A method comprising:

providing a hybrid dual-phase step-down power converter comprising:

a first phase comprising a plurality of first phase switches connected in series between an input power source and ground;

a second phase comprising a plurality of second phase switches connected in series between the input power source and ground; and a first flying capacitor of the first phase and a first flying capacitor of the second phase cross-coupled between the first phase and the second phase; and configuring switches of the first phase and switches of the second phase such that a ratio of an input voltage of the hybrid dual-phase step-down power converter to an output voltage of the hybrid dual-phase step-down power converter is equal to N/D, and wherein N is an integer, and D is a duty cycle of the hybrid dual-phase step-down power converter.

16. The method of claim 15, wherein N is equal to 2, and the hybrid dual-phase step-down power converter comprises:

a first switch, a second switch and a third switch connected in series between ground and the input power source;

a fourth switch, a fifth switch and a sixth switch connected in series between ground and the input power source;

a first flying capacitor connected to a common node of the first switch and the second switch, and a common node of the fifth switch and the sixth switch;

a second flying capacitor connected to a common node of the fourth switch and the fifth switch, and a common node of the second switch and the third switch;

a first inductor connected between the common node of the first switch and the second switch and an output terminal of the hybrid dual-phase step-down power converter; and a second inductor connected between the common node of the fourth switch and the fifth switch and the output terminal of the hybrid dual-phase step-down power converter.

17. The method of claim 16, further comprising:

configuring the hybrid dual-phase step-down power converter to operate in four different time intervals with the duty cycle in a range from 0% to 50%;

in a first time interval, configuring the first switch, the third switch and the fifth switch to be turned on, and configuring the second switch, the fourth switch and the sixth switch to be turned off;

in a second time interval, configuring the first switch and the fourth switch to be turned on, and configuring the third switch, the second switch, the sixth switch and the fifth switch to be turned off;

in a third time interval, configuring the first switch, the third switch and the fifth switch to be turned off, and configuring the second switch, the fourth switch and the sixth switch to be turned on; and in a fourth time interval, configuring the first switch and the fourth switch to be turned on, and configuring the third switch, the second switch, the sixth switch and the fifth switch to be turned off.

18. The method of claim 15, wherein N is equal to 3, and the hybrid dual-phase step-down power converter comprises:

the first phase comprising a first switch, a second switch, a third switch and a fourth switch connected in series between ground and the input power source;

the second phase comprising a fifth switch, a sixth switch, a seventh switch and an eighth switch connected in series between ground and the input power source;

a first flying capacitor of the first phase connected to a common node of the second switch and the third switch, and a common node of the fifth switch and the sixth switch;

a second flying capacitor of the first phase connected to a common node of the first switch and the second switch, and a common node of the third switch and the fourth switch;

a first flying capacitor of the second phase connected to a common node of the sixth switch and the seventh switch, and the common node of the first switch and the second switch;

a second flying capacitor of the second phase connected to the common node of the fifth switch and the sixth switch, and a common node of the seventh switch and the eighth switch;

a first inductor connected between the common node of the first switch and the second switch and an output terminal of the hybrid dual-phase step-down power converter; and a second inductor connected between the common node of the fifth switch and the sixth switch and the output terminal of the hybrid dual-phase step-down power converter.

19. The method of claim 18, further comprising:

configuring the hybrid dual-phase step-down power converter to operate in four different time intervals with the duty cycle in a range from 0% to 50%;

in a first time interval, configuring the first switch, the third switch, the sixth switch and the eighth switch to be turned on, and configuring the second switch, the fourth switch, the fifth switch and the seventh switch to be turned off;

in a second time interval, configuring the fifth switch and the first switch to be turned on, and configuring the seventh switch, the second switch, the third switch, the fourth switch, the sixth switch and the eighth switch to be turned off;

in a third time interval, configuring the first switch, the third switch, the sixth switch and the eighth switch to be turned off, and configuring the second switch, the fourth switch, the fifth switch and the seventh switch to be turned on; and in a fourth time interval, configuring the first switch and the fifth switch to be turned on, and configuring the third switch, the second switch, the seventh switch, the fourth switch, the sixth switch and the eighth switch to be turned off.

20. The method of claim 15, further comprising:

configuring a current path having two flying capacitors connected in series to be discharged to a voltage level equal to a voltage of two current paths having one flying capacitor before configuring the two current paths to start discharging in parallel with the current path having two flying capacitors connected in series, to prevent charge transferring between flying capacitors from occurring.

21. The method of claim 15, further comprising:

applying an input voltage to an output terminal of the hybrid dual-phase step-down power converter;

coupling a load to an input terminal of the hybrid dual-phase step-down power converter; and configuring the switches of the first phase and the switches of the second phase such that:
  the hybrid dual-phase step-down power converter is configured to operate a step-up operation mode; and
  a ratio of a voltage across the load to the input voltage is equal to N/D.

* * * * *